(12) United States Patent
Van Horn Steel et al.

(10) Patent No.: US 7,823,342 B1
(45) Date of Patent: Nov. 2, 2010

(54) SYSTEM AND METHOD FOR ATTACHING PANELS TO ENABLE REMOVAL FROM THE INSIDE OF A STRUCTURE

(75) Inventors: Philip Van Horn Steel, Vero Beach, FL (US); Paul J. Lagassey, Vero Beach, FL (US)

(73) Assignee: PanelScape, LLC, Vero Beach, FL (US)

( * ) Notice: Subject to any disclaimer, the term of this patent is extended or adjusted under 35 U.S.C. 154(b) by 175 days.

(21) Appl. No.: 11/852,994

(22) Filed: Sep. 10, 2007

Related U.S. Application Data

(60) Provisional application No. 60/825,053, filed on Sep. 8, 2006.

(51) Int. Cl.
  E04B 2/82 (2006.01)
  E06B 3/26 (2006.01)
  E06B 3/68 (2006.01)
  E05B 65/10 (2006.01)

(52) U.S. Cl. .................. 52/127.8; 52/202; 49/57; 49/141; 292/21

(58) Field of Classification Search .......... 52/202, 52/157.1, 127.7, 127.8; 411/513; 49/141, 49/50, 57; 292/21
See application file for complete search history.

(56) References Cited

U.S. PATENT DOCUMENTS

| | | | | |
|---|---|---|---|---|
| 4,057,935 A * | 11/1977 | Rohrberg et al. | ................ | 49/56 |
| 4,070,048 A * | 1/1978 | Young | ................ | 292/179 |
| 4,111,477 A * | 9/1978 | Rigali | ................ | 292/252 |
| 4,127,966 A * | 12/1978 | Schmidt | ................ | 49/141 |
| 4,164,095 A * | 8/1979 | Musacchia | ................ | 52/1 |
| 4,208,837 A * | 6/1980 | Black et al. | ................ | 49/56 |
| 4,258,504 A * | 3/1981 | Hicks | ................ | 49/56 |
| 4,263,747 A * | 4/1981 | Coltrin et al. | ................ | 49/56 |
| 4,631,862 A * | 12/1986 | Gallardo | ................ | 49/56 |
| 4,634,157 A * | 1/1987 | Fernandez | ................ | 292/218 |
| 4,771,574 A * | 9/1988 | Stephens | ................ | 49/141 |
| 4,796,384 A * | 1/1989 | Warwick | ................ | 49/55 |
| 4,856,229 A * | 8/1989 | Tserng | ................ | 49/56 |
| 4,897,961 A * | 2/1990 | Shine | ................ | 49/141 |
| 4,997,218 A * | 3/1991 | Culling | ................ | 292/60 |
| 5,007,200 A * | 4/1991 | Londono | ................ | 49/141 |
| 5,012,610 A * | 5/1991 | Carballo | ................ | 49/57 |
| 5,174,063 A * | 12/1992 | Lewis et al. | ................ | 49/141 |
| 5,584,514 A * | 12/1996 | Mascotte | ................ | 292/57 |
| 5,657,578 A * | 8/1997 | Thompson | ................ | 49/141 |
| 5,683,123 A * | 11/1997 | Ruoss | ................ | 292/57 |
| 6,532,702 B1 * | 3/2003 | Scribner | ................ | 52/202 |
| 6,578,664 B1 * | 6/2003 | Doherty | ................ | 182/93 |

(Continued)

*Primary Examiner*—Richard E Chilcot, Jr.
*Assistant Examiner*—Andrew J Triggs
(74) *Attorney, Agent, or Firm*—Ostrolenk Faber LLP; Steven M. Hoffberg

(57) ABSTRACT

A system and method which provides a means to install a hurricane shutter panel in a manner which enables release of the panel from the inside of the structure, thus providing means of egress through the opening on which the panel is installed. There are four preferred embodiments of the invention to correspond with the four primary means for installing hurricane shutter panels; namely angle track, F-Track, direct mount systems using wall anchors and direct mount systems using direct mount studs permanently mounted into a structure. The various embodiments require little or no modifications to the components of the various industry standard installation systems. The invention can be used with new installations or adapted to existing installations.

11 Claims, 18 Drawing Sheets

U.S. PATENT DOCUMENTS

| | | | |
|---|---|---|---|
| 7,097,240 B2 * | 8/2006 | Kurtz et al. | 296/218 |
| 7,325,365 B2 * | 2/2008 | Warner | 52/203 |
| 7,337,582 B1 * | 3/2008 | Klotz | 49/465 |
| 7,438,336 B1 * | 10/2008 | Wolf et al. | 292/341.17 |
| 2006/0283131 A1 * | 12/2006 | Wolf et al. | 52/698 |
| 2007/0107327 A1 * | 5/2007 | Warner | 52/202 |
| 2007/0113494 A1 * | 5/2007 | Kim et al. | 52/202 |
| 2008/0040994 A1 * | 2/2008 | Borland | 52/202 |
| 2009/0019797 A1 * | 1/2009 | Gunn | 52/202 |

\* cited by examiner

SYSTEM AND METHOD FOR ATTACHING PANELS TO ENABLE REMOVAL FROM THE INSIDE OF A STRUCTURE

FIELD OF THE INVENTION

The invention relates to panels, particularly mounting systems and methods which permit removal of the hurricane panels from the inside of a structure. Hurricane panels are typically attached from the outside of a structure and are not removable from inside the structure. This system provides a means to release the panels from the inside of the structure, thus providing additional means of egress, should the primary means of egress become unusable.

BACKGROUND OF THE INVENTION

If a structure is to be occupied when hurricane panels are installed, it is necessary to have at least one opening where the hurricane protection system can be secured and removed from inside the structure. While other more expensive hurricane protection systems such as accordion shutters can be opened and closed from inside the structure, hurricane panels typically can only be attached or removed from outside of the structure.

In recent years, many local governments in hurricane prone regions have mandated in their building codes that all new structures must have hurricane protection. Some coastal counties have further mandated that all structures, new or existing, have hurricane protection installed. Furthermore, most insurance companies either require or offer significant discounts for the installation of hurricane protection. Of the many hurricane protection products available, hurricane shutter panels are the most affordable. With the proliferation of hurricane protection, more people will rely on their hurricane protection. As a result, less people will evacuate and more people will stay in their homes during a storm. The incidence of fires during power failures are much higher as a result of the use of lamps and candles. As more people stay in shuttered homes during hurricanes, it is likely that more people will need egress from their homes in an emergency. In fact, many local governments already require emergency egress from at least one opening in every bedroom. One major draw-back of hurricane panels, however, is they can usually only be installed and removed from the outside of a structure. Other systems for providing hurricane protection such as roll down and accordion shutters, and impact glass, which can be opened and closed from inside a building, are substantially more expensive than hurricane shutter panels. The instant invention solves this problem by facilitating the quick release of hurricane shutter panels from inside a structure with minimal additional costs. The system works in conjunction with industry standard hurricane hardware and installation methods and provides an affordable solution to creating emergency egress through openings protected by hurricane shutter panels.

When mounting hurricane panels utilizing this invention, at least one panel or series of panels covering a window or door opening is mounted in a way that allows the panel(s) to be removed from inside the structure. This permits egress from the structure through openings normally blocked when hurricane panels are installed. Typically, only one door opening is the primary means of egress from the structure. Enabling the removal of hurricane protection from the inside of the structure usually involves more expensive hurricane protection products such as accordion shutters. While it is desirable to have more than one means of egress, in case the primary means of egress becomes unusable, many home or business owners choose to use the much more affordable hurricane panel rather than alternate protection systems which typically cost three to five times as much as panels. The present invention seeks to overcome these limitations by providing a hurricane panel mounting system and method that can be used in conjunction with industry standard installation techniques. The invention described herein permits hurricane panels, mounted with or without mounting track to be removed from within the structure. The system and method of the present invention may, for example, work with standard installation tracks and accessories, as well as existing direct mount systems, and is typically reusable.

SUMMARY OF THE INVENTION

There are four primary means for attaching hurricane panels to a structure, and accordingly there are four major embodiments of the present invention. A first embodiment is designed for use with studded angle track, a second embodiment is designed for use with F-Track, a third embodiment is designed for use with direct mount systems that use wall anchors, and a fourth embodiment is designed for use with direct mount systems that use bolts mounted directly into a structure.

An assembly comprising at least a bolt, nut, pin, a handle attached to the pin by a ring or cable sufficient to provide a tensile force on the pin, distal from the pin, is used to facilitate the removal of a hurricane shutter panel from inside the structure.

A common means of mounting hurricane panels is to use studded angle track to retain the bottom of the panel and H-Header or other similar header track to retain the top of the panel. This first embodiment of this invention is intended to be used with this configuration of studded angle and H-Header or other similar header track; however, it can be used with studded angle track at both ends of the panel. The most popular hurricane panels, whether steel, aluminum or polycarbonate are nominally 12" wide. Typically, these panels are attached to the building using a series of three studs or bolts at each end of a hurricane shutter panel, whether the panel is mounted either to mounting track or directly to the structure. In this embodiment of the invention, the standard mounting studs are removed from the studded angle, and replaced with specially designed, headless, threaded bolts, each such threaded bolt cross-bored with a hole at one end to accept a pin or clip. Rings or cables are used to attach the pins or clips to a handle. The panels are put in place, and standard, washered wing nuts are used to attach the panels in the normal fashion. The wing nuts are then tightened with sufficient tension to hold the panel firmly in place, but not with so much tension as to make it difficult to extract the pins. While the preferred embodiments use wing nuts, standard hex nuts or other means of attaching threaded objects together may be used for this purpose. Likewise, the preferred embodiments use hitch pin clips for the pins, however any type of pin, for example a cotter pin or quick release pin can be used for this purpose.

To assist in securing and holding the panel in place with the proper amount of tension, an optional washer comprised of neoprene, silicone, rubber or other similar material can be placed between each wing nut and the panel. Optionally, this washer can be attached to the wing nut with an adhesive. Alternately, springs or wedges can be used to maintain the tension on the panel. The use of these washers, springs or wedges helps assure that the panel is securely mounted while preventing excessive shear force on the pins or clips so as to prevent easy removal.

Once the panels are mounted, the pins or clips are attached to the handle, and the system is ready for use. Note that in this and all other embodiments, the panels being mounted with the present invention must be placed on top of (outside of) any adjacent, traditionally mounted panels. A hurricane shutter panel installed with the assembly can be removed from the building interior by pulling on the handle, thereby causing a tensile force on the rings or cables, which extract the pins from the bolts, thereby allowing the bolts and hurricane shutter panel to separate from the studded angle track and be removed from the building to permit egress.

Often, studded angle track is used to secure the panel bottom and H-Header or other similar header track to secure the panel top. Some times, two pieces of studded angle track, one at each panel end are used to mount the panel. This embodiment can be used for either mounting method. Separate handle assemblies are required for each end of a panel attached to the structure using the studded angle track.

In cases where there is no room behind the studded angle track for the back of the bolts and pins or clips, an alternate embodiment can be used. In this alternate embodiment, the studs which will hold the panels being mounted are replaced with similar bolts having a hole cross-drilled through the outboard end of the bolt. (Alternatively, the bolts in the studded angle can be drilled in place.) After the panel is in place, it is secured with a spring, washer and pin such that the spring pressure securely holds the panel(s) in place. Optimally, at least one washer can be placed between the spring and the pin or clip to aid in compressing the spring. A second optional washer can be placed between the panel and the spring. Holes are drilled through the panel, sufficient in size and location to allow cables, lines or wires connecting the pins outside of the panel to the handle assembly inside the panel. When the user pulls firmly on the handle, the pins or clips are displaced from the bolts, and the springs and washer assembly holding the panel in place come off, allowing the panel to be removed. The cable, line or wire being used with this alternate embodiment must be sufficiently strong so as not to be cut by the edges of the hole in the panel and to not break when tension is applied. A grommet may be installed into the hole drilled in the panel to protect the cable, line or wire from any such sharp edge. Note that this alternate embodiment can also be used with direct mount systems if holes are drilled in the direct mount bolts before installation or for existing installations if such holes are drilled in place.

To prevent the spring and washer assembly from being lost when the panels are removed, optionally, these can be attached to the pin or clip by a light line or other retaining member.

Another means of securing the panel for use is to place at least one wedge between the panel and track, from inside the structure. The wedge replaces or supplements the aforementioned spring to bind the panels and hold them firmly between the track and the washer and pin or clip assembly. In other words, the wedge may be used between the panel(s) and studded angle track to force the panel snuggly against the washer and pin assembly. Optionally, the wedge(s) can be attached with cables to the handle in a manner that will cause the wedge(s) to also be extracted when the user pulls on the handle. If the wedge(s) are so attached to the handle, this extraction can take place simultaneously with the extraction of the pins or the attachment system can be modified so the wedge(s) are extracted before the pins. To remove the panel, the user pulls on the handle to extract the pins or clips (and optionally, any wedges) and the panel comes off. The wedges may be composed of plastic, wood, metal or any other suitable material. This wedging system can be used with any embodiment to apply additional tension to keep the panels secure while in use.

This wedge or system of wedges may be used with the spring assembly or with any other embodiment to assist in maintaining tension on the panel, the object being for the panel to be firmly mounted in place in order to minimize oscillation of the panel during periods of high winds, and to enable tension on the pins to be released from the inside when the at least one wedge is/are extracted.

The handle is preferably constructed of a metal or plastic material, sufficient in strength to support the forces exerted when extracting the pins from a mounted assembly. However, it can be of any shape and material. If desired, the holes for the mechanisms which attach the handle to the pins or clips can be reinforced. Also if desired, holes can be placed in the handle for securing the bolts, washers and pin or clip assemblies when they are not in use to prevent them from becoming separated from the handle. Likewise, cable ties attachable to the handle may be used to neatly store the lines or cables in coiled configuration when not in use. Mounting and operating instructions can also be printed on the handle, or attached by a hang-tag. Rings as shown are the preferred means for attaching the pins or clips to the handle, although lines, clips or any other means can be used to attach the pins or clips to the handles.

Note that a single handle can be used to release each panel. If two adjacent panels are to be mounted using this system, the handle can be modified to accommodate the required number of pins, typically five for two panels so mounted side-by-side.

The assembly of handle, tensile members, and pins may also be integrated into the panel. For example, a set of rings or conduits may be provided on the inside, or in some cases partially on the outside, to guide and retain the tensile members (e.g., cables) to their correct position without binding. In this case, it may be useful to provide a handle which disengages the pins from the bolts by a twisting motion, with the handle pivoting about an axis, to supply the necessary tension. Alternately, a sufficiently rigid connection between the handle and pins may be provided to permit use of a pushing force instead of a pulling force.

A second embodiment is designed to be used with F-Track. In this embodiment, holes are drilled in the end of the bolts that are inserted into the F-track at the end that goes into the track. These bolts may have a round or square head, and unlike standard F-Track bolts, the head is sufficiently small so it can pass through the opening in the front of the F-Track, and is retained within the F-track by a pin inserted through the aforementioned hole, rather than the standard bolt head, which normally retains the bolt inside the channel within the F-Track. Therefore, these bolts can be inserted and removed from the front of the track, rather than sliding them from end to end as with standard F-track bolts. These bolts are threaded at the end opposite from the hole, to allow for a wing nut to be attached. Other holes are drilled through the F-track, in positions corresponding to the holes in the panels that will be mounted to the F-track. Depending on the type of pin or clip being used, one or two holes may be required to secure each bolt. These holes need to be sufficient in diameter to accommodate the pins or clips that are used to secure the bolts. A pin or clip is passed through the hole in the F-track corresponding to each threaded bolt, and through the hole in each corresponding bolt. Once the bolts are rigged to the F-track with the pins, the panels are put in place, and wing nuts are used to attach the panels in the usual manner—with sufficient tension to hold the panel in place, but not so much tension as to make it difficult to extract the pins. To assist in securing and holding the panel in place with the proper amount of tension, a washer comprised of neoprene, silicone, rubber or other similar material can be placed between each wing nut and the panel. Optionally, this washer can be attached to the wing nut with an adhesive. Alternately, springs with or without washers can be placed between the panel and wing nuts, or a wedge can be placed from the inside between the panel and the F-Track.

Before or after the panels are mounted, the pins or clips are attached to the handle by rings or cables, and the system is ready for use. To remove the panels, the user pulls firmly on the handle to extract the pins. After the pins are extracted, when outward pressure is placed on the panel(s), the bolts may be dislodged from the F-track thereby freeing the panel (s) to be removed. As with the first embodiment, this second embodiment can be used with a configuration of F-Track to secure the panel bottom and H-Header or other similar header track to secure the panel top. It can also be used with F-Track on one end of the panel and any other type of mounting system (including another F-Track) on the other end of the panel. As with other embodiments, a second handle and cable assembly is required for each end of a panel secured with the system.

A third embodiment is adapted to be used with direct mount systems, where the mounting bolts are attached to the structure with threaded anchors and bolts. The standard threaded bolt with a flat head is replaced with a headless bolt, which may be threaded in its entirety or partially threaded. A hole sufficient in size to accommodate a pin or clip is drilled into the bolt at one end. If one end is not threaded, this hole is drilled in the unthreaded end. A metal sleeve with a length approximating the length of the portion of the threaded bolt that protrudes from the structure has a smooth inside diameter that is large enough so said sleeve will fit over the threaded bolt. A hole is drilled through this metal sleeve at one end corresponding to the hole in the bolt. This metal sleeve is threaded on the outside on at least at one end opposite the hole, although this sleeve may be threaded in its entirety. A wing nut that fits the thread on the outside of the sleeve is attached to the sleeve such that the flat surface of the wing nut will face the structure. To attach the panel(s), the bolts are screwed into the threaded wall anchor and the panel(s) is put in place. The sleeve assembly is then placed over each bolt and attached to the bolt through the corresponding holes in the bolt and sleeve using the pin or clip. Each of the wing nuts are then tightened down to secure the panel. A hole is drilled through the panel sufficient in size and location to allow the necessary number of lines or cables to be passed through the hole and attached to the pins or clips. The other ends of the lines are attached to the handle which is inside the structure. When the user pulls firmly on the handle, the pins or clips come out, and the sleeve assembly holding the panel in place is released, allowing the panel to be removed. The line or cables being used with this alternate embodiment should be sufficiently strong so as not to break when tension is applied to the pins and to not be cut by the edges of the hole in the panel. A grommet may be provided to shield the cable, line or wire from any such sharp edge.

As with the other embodiments, to assist in securing and holding the panel in place with the proper amount of tension, a washer comprised of neoprene, silicone, rubber or other similar material can be placed between each wing nut and the panel. Optionally, this washer can be attached to the wing nut with an adhesive or molded in place. Alternately, springs with or without washers can be placed between the panel and wing nuts, or a wedge can be placed between the panel and the structure.

Note that this third embodiment can also be used with direct mount systems where the mounting bolts are already or will be permanently attached to the structure. Appropriate holes are drilled through the bolts before they are installed. If already installed, the holes may be drilled in place. Also note that this embodiment can be used in combination with a direct mount system at one end of the panel and a track mounting system at the other end, including but not limited to studded angle track, F-Track and H-Header or other similar header track.

In an alternate embodiment, which is a variation of the third embodiment, the metal sleeve is not threaded and is shorter than the length of the portion of the threaded bolt that protrudes from the structure. It has a smooth inside diameter that is large enough so said sleeve will fit over the threaded bolt, and a hole which aligns with the hole on the bolt. When the sleeve is installed, at least one washer is placed between the panel and the sleeve, such that there are a sufficient number of washers to hold the panel snugly to the wall when the pin or clip is passed through the sleeve and bolt. This alternate embodiment particularly lends itself for use with a wedge or system of wedges placed between the structure and the panel from the inside to add additional tension to the panel so it is held firmly in place during use.

This third embodiment can also be adapted for use with direct mount studs by adapting the direct mount studs with a hole in the end of the portion that secures the panel. If desired, the direct mount studs can be adapted without thread on the panel end, or the sleeves can adapted so the inside diameter is sized to fit over the direct mount studs.

A fourth embodiment is adapted for use with direct mount systems, where the mounting bolts are already, or will be, permanently attached directly into the structure. This embodiment can be used when it is not possible or preferable to replace or modify the existing direct mount bolts already mounted in a structure. In this embodiment, two sleeves are used. A first (inside) sleeve is threaded on the inside to match the thread of the portion of the mounting bolt that protrudes from the structure. This sleeve is longer than the portion of the mounting bolt that protrudes from the structure. The outside of this first sleeve is preferably smooth, and a hole is drilled through this first sleeve at one end, the hole being sufficient in size to accommodate the pins or clips. A second (outside) sleeve, that is large enough to fit over the first sleeve, has a length that approximates the length of the first sleeve. It is preferably smooth on the inside and threaded on the outside to accommodate a wing nut. A hole is also drilled through one end of this second sleeve which aligns with the holes in the first sleeve. To mount the panel, the first, inside sleeve is turned snuggly onto each of the mounting bolts protruding from the wall of the structure corresponding to the panel. The panel is put in place and secured by the second sleeves and wing nut assemblies, which are placed over the first sleeves, with the flat side of the wing nut facing the panel. The two sleeves are attached together by inserting the pins or clips through the corresponding holes. The panel is then secured by tightening the wing nuts. A hole is drilled through the panel sufficient in size to allow the necessary number of lines or cables to be passed through the hole and attached to the pins or clips. The other ends of the lines are attached to the handle which is inside the structure. When the user pulls firmly on the handle, the pins or clips come out, and the sleeve and nut assembly holding the panel in place comes off, allowing the panel to be removed.

Also note that this embodiment can be used in combination with a direct mount system at one end of the panel and a track mounting system at the other end, including but not limited to studded angle track, F-Track and H-Header or other similar header track.

Alternately, mechanism and cable may reside entirely on one side of the panel. Where necessary, a first sleeve may securely fit over the bolt, threaded on the inside, and having a cross drilled hole. Otherwise, the bolt itself may provide the cross drilled hole or groove. A second sleeve has a self-locking quick release retainer which fits over the sleeve or bolt, and engages a hole or groove formed in the first sleeve. The tension of the cable releases the quick-release mechanism, which may involve sliding a pin or releasing a pressure on a set of hard steel balls which engage the groove, thus disengaging the panel. To engage the second sleeve and the first sleeve or bolt, if the mechanism involves a pin, the pin must be retracted while the sleeves are engaged, and then the pin retraction is released, allowing the pin to pass through the holes. If the mechanism provides a set of ball-in-groove mechanisms, or latches, the force of insertion in conjunction with an inclined surface (provided on one side, to provide asymmetrical insertion and release forces) may be sufficient to depress the ball or latch during insertion, which is then locked in the groove. In each case, the pin or ball or latch mechanism is preferably attached to the panel, and, for example, spring loaded. Advantageously, if a set/reset function is required to engage or disengage the panel, a redundant mechanism may be provided on the outside of the panel to release the mechanism, thereby simplifying the process and not requiring manual operations on both the interior and exterior. The exterior mechanism may have a lock, to provide security in case the panel is used to prevent exterior access in addition to environmental protection. Of course, similar mechanisms may also be used with the other embodiments to provide security, quick release, latch retention, etc.

Some quick release mechanisms require a pushing force to disengage the latching mechanism. This force may be converted from the pulling force of the cable by a lever or other simple mechanism as may be required. Further, an electrically activated solenoid may also be used to release the panel, replacing the handle and cable as the source of the disengaging force with an electrical actuator, battery, wire, and solenoid. See, U.S. Pat. No. 7,125,058, expressly incorporated herein by reference.

According to a yet further embodiment, instead of using a wing nut, at least one washer that fits over the first sleeve, but not over the second sleeve, is placed between the panel and the second sleeve before the first and second sleeves are attached with the pins or clips. A wedging system such described in other embodiments is then used to apply tension to the panels. In this alternate embodiment, the wedge or wedges are placed directly between the structure and the panel to apply tension.

With all embodiments, when the assemblies are completed, the handle may be secured to the inside face of the panel, using hook and loop fastener, adhesive tape, suction cups or other suitable, temporary method of attachment. This permits the window or door being protected to be freely operated, prevents the cable from entanglement and places the handle in an easily accessible position so that the release mechanism may be quickly and easily accessed and operated. Ideally, all embodiments, when marketed, should be supplied with operating directions and warnings, clearly printed on a tag attached to the handle or directly embossed into the handle itself.

DETAILED DESCRIPTION OF THE INVENTION

Figure 1:
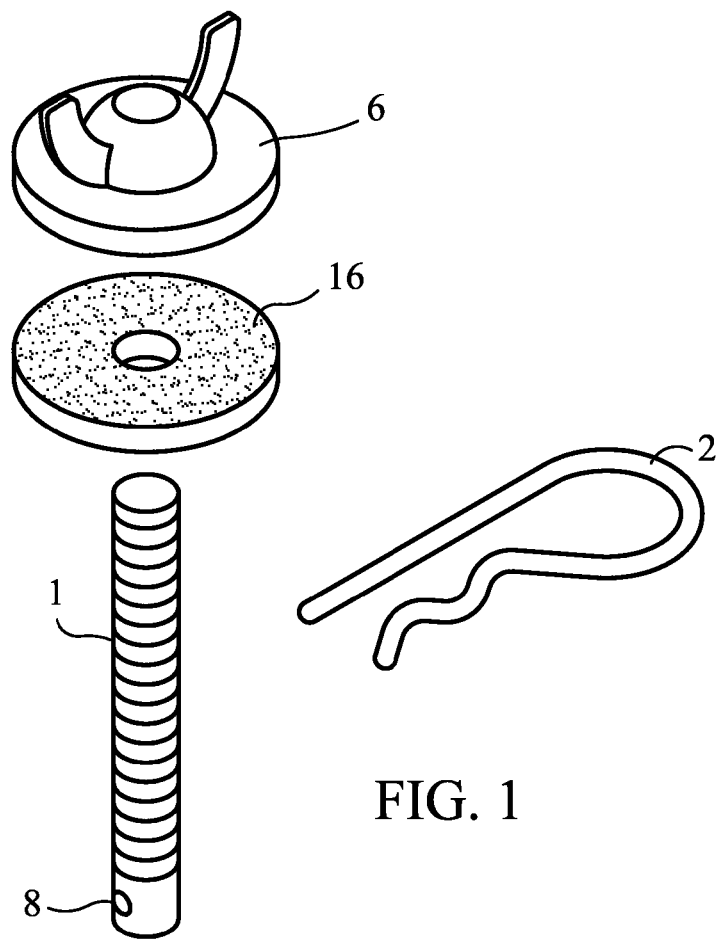
FIG. 1 shows the hardware components used with the first embodiment of the invention, being a headless bolt, washer, wing nut and pin.

FIG. 1 shows the hardware components used with the first embodiment, which utilizes headless bolts 1, pins 2, neoprene washers 16 and wing nuts 6. The bolts 1 have holes 8 provided or drilled within close proximity to one end. The holes 8 are sufficiently large in diameter to accommodate the pin 2.

Hitch pin clips are preferably utilized for the pins 2, but any type of pin, for example a cotter pin or quick release pin, can be utilized, provided that the ring 3 can be attached to the pin 2, the pin 2 can pass through the hole 8 in the bolt 1, and the pin 2 can be removed from the bolt 1 by pulling on a handle (not shown), the object being to hold the bolts 1 in place and to facilitate extraction of the pins 2 and removal of the bolts 1 when desired. The pins 2 and bolts 1 are adapted to resist shear force deformation to enable disengagement of the pins 2 from the bolts 1. Likewise, the disengaging force is preferably aligned along an axis perpendicular to the axis of the bolts 1, such that normal forces produced by storms would not disturb the linkage between the bolts 1 and the handle (not shown). Other types of latching and disengagement for the bolts 1 may also be provided. Wing nuts 6 are preferably utilized for securing the panel 5 on the bolts 1, although standard hex nuts can also be used for this purpose.

Other components of the system not shown in FIG. 1 are the angle track, shutter panel, handle, and rings for attaching the pins to the handle. Although an optional neoprene washer 16 is used in the first embodiment, the washer could be composed of nylon, rubber or any other material suitable for the purpose.

Figure 2:
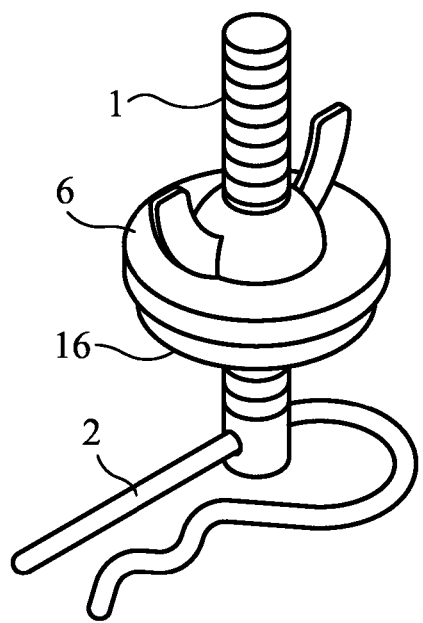
FIG. 2 shows the components of FIG. 1 as assembled.

FIG. 2 shows the hardware components of FIG. 1 as assembled.

Figure 3:
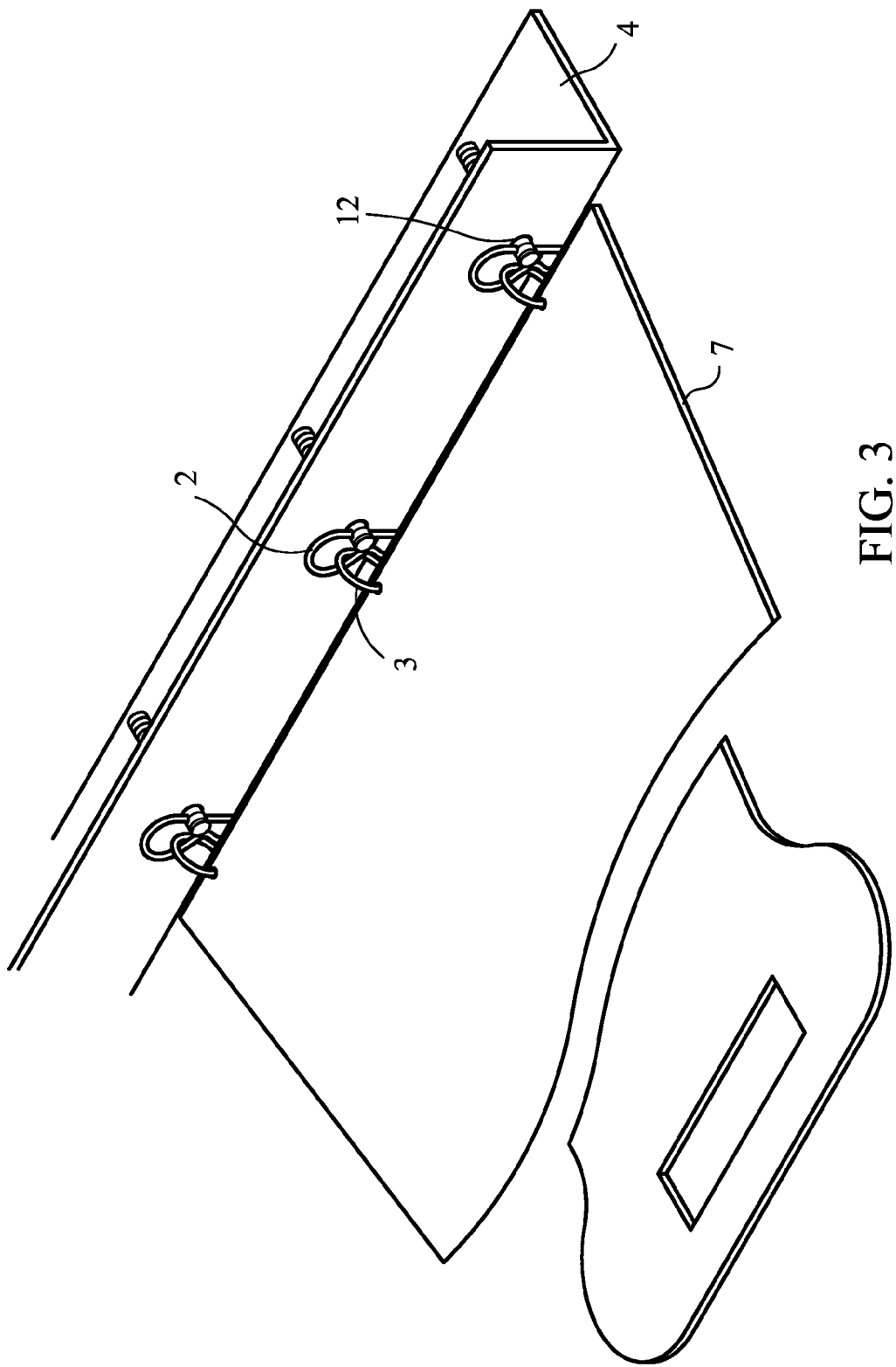
FIG. 3 shows a view from inside the structure of the components of the first embodiment as setup before the panel is installed. After the panel is installed, the handle is raised and seated against the panel and attached to the inside face of the panel by a temporary method.

Referring to FIG. 3, pins 2 are placed through the hole at one end of each bolt 1. In this first embodiment, a ring 3 is used to connect the handle 7 to the pin 2. If desired, the handle can be reinforced at the points where the rings 3 pass through the handle 7. Although rings 3 similar to key rings are the preferred means to use with this embodiment, clips, lines, wires cables or any other means for attaching the pins 2 to the handle 7 can be used, and if lines, wires or cables are used, one separate cable can be used for all the pins 2 or a single line, wire or cable can be attached to all the pins 2. Various types of lines, wires or cables may be used such as polypropylene rope, steel wire, high tensile strength fishing line, etc. The handle 7 is constructed of a material and in a configuration such that the rings 3 attach to the handle 7 in a way so that the rings 3 do not come off the handle 7 when the handle 7 is pulled to extract the pins 2. Preferably, the handle 7 has an ergonomic configuration to facilitate grasping in the palm by a user and pulling with a closed fist. Preferably, the ring 3 and pin 2 are separate components, however, the ring 3 and pin 2 may be integral.

Figure 4:
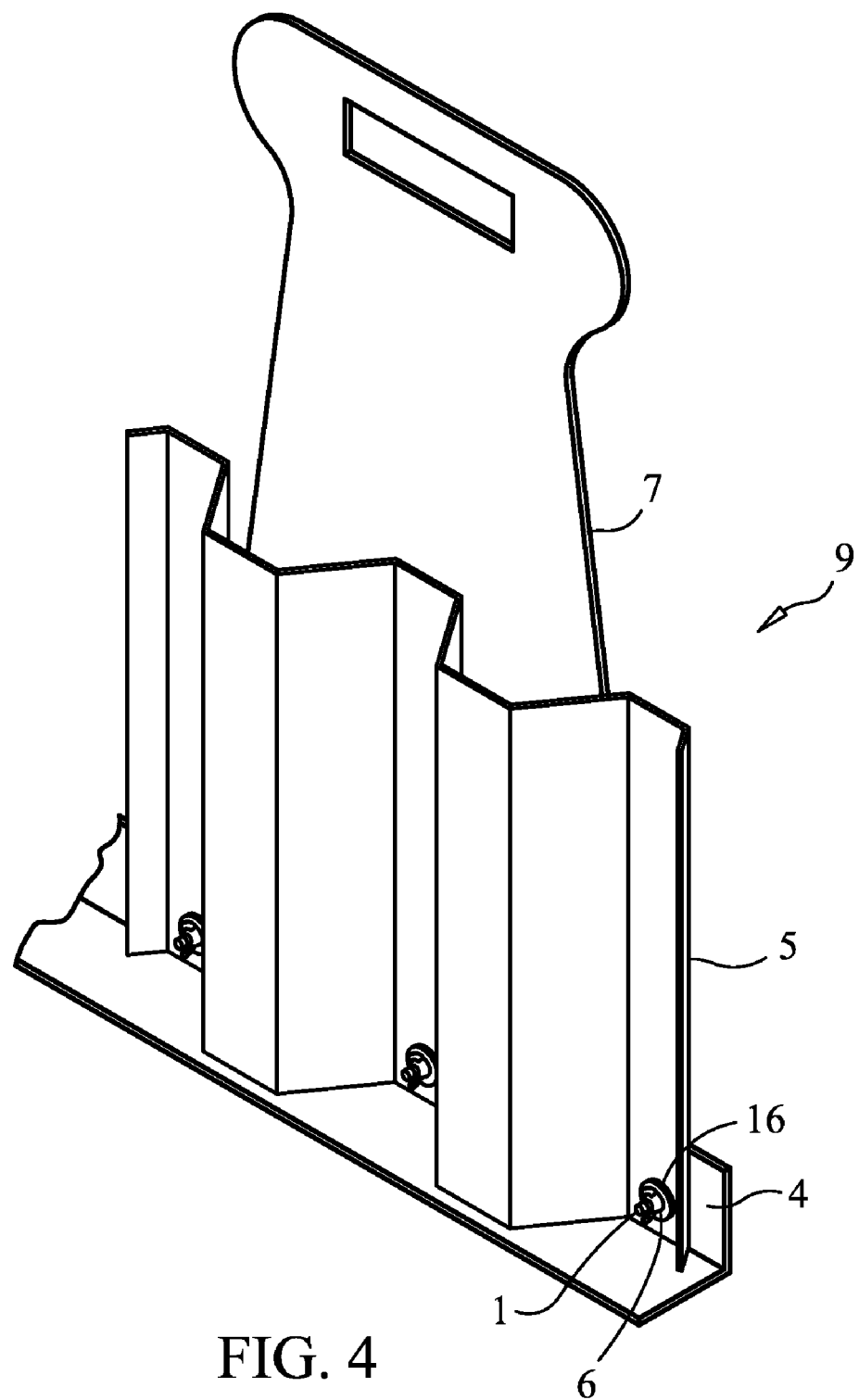
FIG. 4 shows a view from the outside of the structure of the first embodiment with the panel installed ("the assembly").

The combination of the bolts 1, pins 2, rings 3, hurricane panels 5, wing nuts 6, handle 7 and the neoprene washer 16 are referred to as the assembly 9 as shown in FIG. 4 mounted to the angle track 4. Typically a hurricane shutter panel 5 has three holes at each end, and a single assembly 9 comprises three bolts 1, three pins 2, three rings 3, three washers 16, one shutter panel 5 and one handle 7, although the number of bolts 1, pins 2, rings 3 and washers 16 can be adjusted to accommodate hurricane shutter panels 5 that are configured with more or less than three holes per panel.

It is preferable to use a combination of angle track 4 at one end of the panel 5, and H track (not shown) at the other end of the panel 5 to mount the hurricane shutter panel 5 so that only one assembly 9 is needed at one end, being the end with the angle track 4. However, in this first embodiment, angle track 4 may be used at both ends of the panel 5, or one end my have any other type of mounting system used in conjunction with various other embodiments, the object being to enable the panel 5 to be released from the inside of the structure. The angle track 4 must be mounted far enough away from the structure on which the hurricane shutter panels 5 are being installed, in order to allow room for the bolts 1 and the pins 2 between the back of the angle track 4 and said structure, such that the bolts 1 and the pins 2 can be coupled, and the rings 3, or alternately the line, wire or cable can be attached to the pins 3. If two pieces of angle track 4 (or other type of mounting system other than H-Header or other similar header track) are utilized, then two each of assembly 9 may be needed for each hurricane shutter panel 5 being installed, one assembly 9 at each end, typically top and bottom.

When assembling this first embodiment, each bolt 1 is inserted through holes 12 (see FIG. 3) in the angle track 4, such holes 12 being large enough to allow the bolt 1 to pass through the hole 12 in the angle track 4, but adapted to prevent the pins 2 inserted through the bolts 1 from passing through the holes 12. The position of the holes 12 in the angle track 4 needs to correspond to the holes in the hurricane shutter panels 5 that will be attached. Typically, studded angle track 4 is used with the first embodiment, and the studs corresponding to the panel(s) 5 that will be mounted with the invention are removed, thereby leaving the holes 12 through which the bolts 1 can be passed.

If the angle track 4 is mounted too close to the wall of the structure to allow the bolts 1 to be inserted from behind (the side facing the wall) with the pins 2 already attached, the bolts 1 can be placed in the angle track 4 before it is secured in place, or if the angle track 4 is permanently mounted, the ends of the bolts 1 with the holes 8 can be inserted through the holes 12 in the angle track 4 from the front (the side facing away from the wall), and the pins 2 inserted into the holes 8 in the bolts 1 after the bolts 1 are inserted through the holes 12 in the angle track 4.

The hurricane shutter panel 5, once attached with the assembly 9, can be removed from the inside by pulling on the handle 7 to extract the pins 2, allowing the bolts 1 to come out of holes 12 in the angle track when outward pressure is applied to the hurricane shutter panel 5 from inside. Multiple hurricane shutter panels 5 can be installed with multiple assemblies 9.

The hurricane shutter panel(s) 5 that is used with the assembly 9 must be installed on top of the other hurricane shutter panels such that the panel(s) installed with the invention is/are the first panel in place to be removed. If more than one hurricane shutter panel 5 is being attached using the assembly 9, then such panels must be installed last in sequence. The hurricane shutter panel 5 used with the assembly 9 is attached to the assembly with nuts 6, typically a wing nuts, and typically in a manner similar to the other hurricane shutter panels, i.e., from the outside of the structure.

Figure 5:
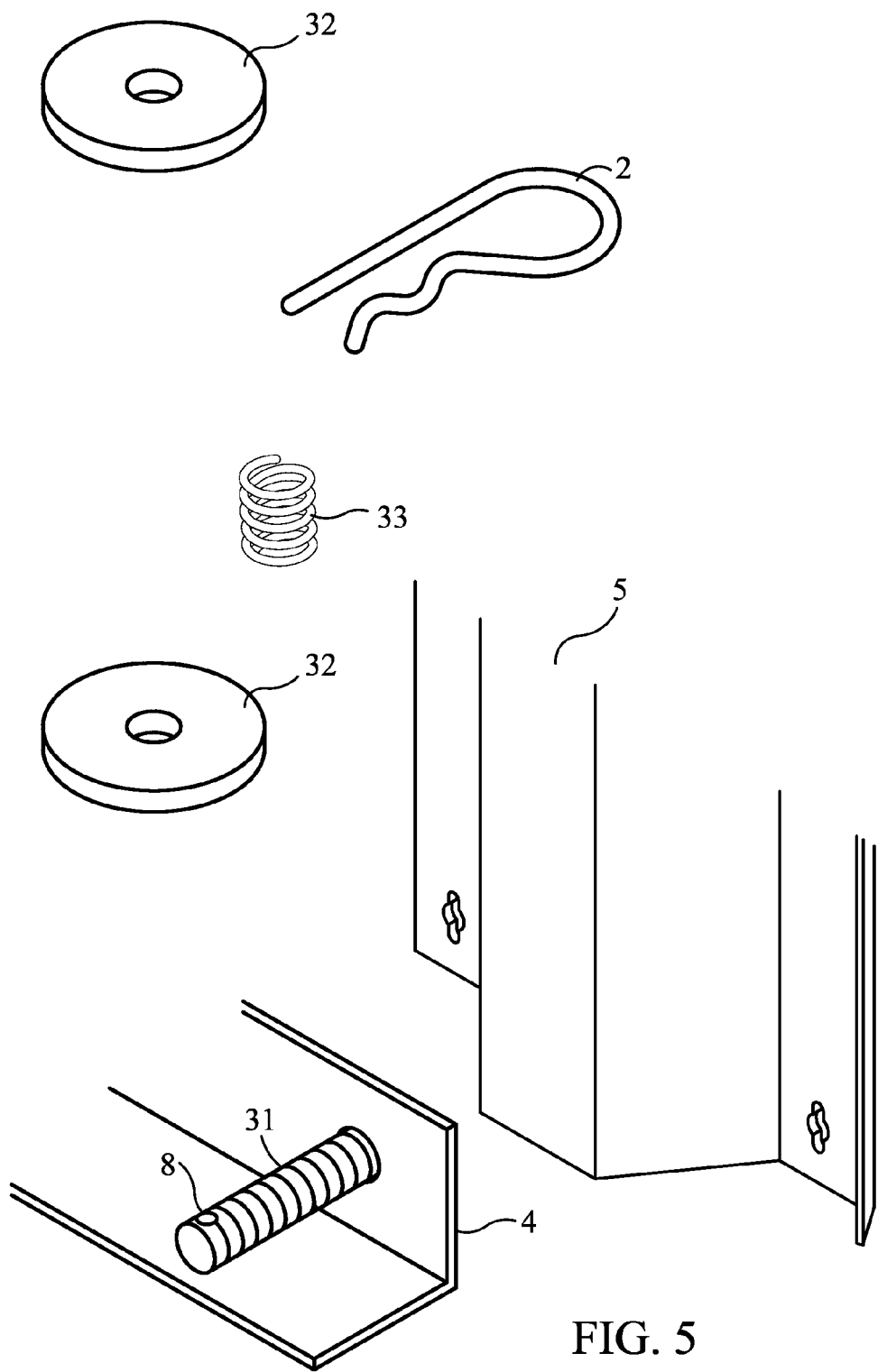
FIG. 5 shows the hardware components for an alternate embodiment utilizing a spring, a pin and two optional washers for use when pins are installed at the outboard end of the stud (exterior releasing embodiments), for example, studded angle track where there is no room to access pins behind the track, or direct mount systems.

FIG. 5 shows the hardware components of an alternate embodiment for use with the first embodiment and with some direct mount systems. This alternate embodiment is used with studded angle track when there is not sufficient room between the structure and the back of the angle track for inserting the bolts and pins of the first embodiment. The components are a studded angle track 30, a stud 31, which is a bolt with a bolt with a special head for mounting in the studded angle track 30, a spring 33, a pin 2 and a hurricane panel 5. Optionally, a washer 32 can be placed between spring 33 and the pin 2 to assist in compressing the spring and provide a surface to support the pin. Also optionally, a second washer 32 and be placed between the panel 5 and the spring 33 to cover the hole in the panel.

Figure 6:
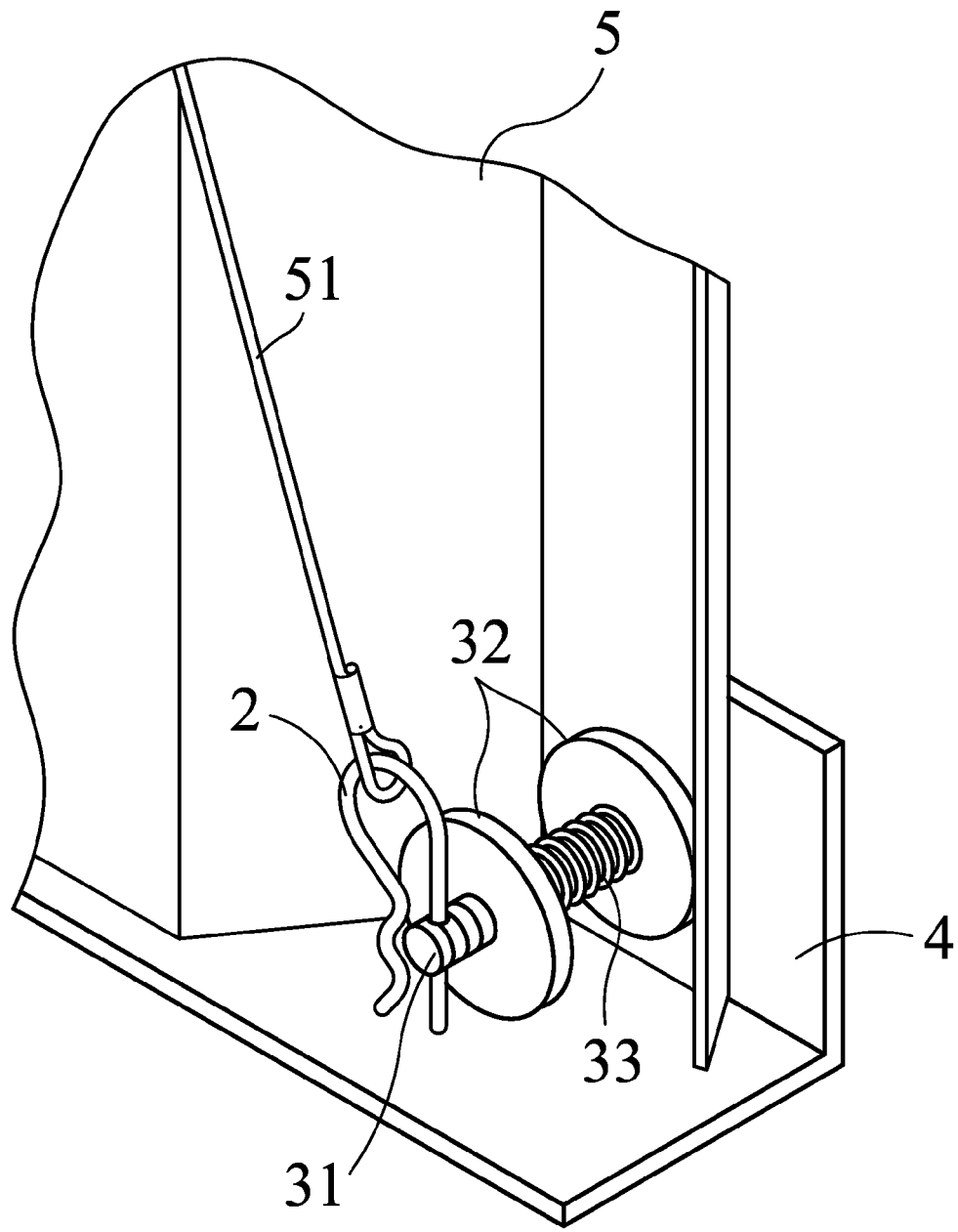
FIG. 6 shows the components of FIG. 5 as assembled.

FIG. 6 shows the components of FIG. 5 as assembled, with both of the optional washers 32. Optionally, a light line, cable or other retaining member (not shown) can be used to connect the springs 33 to the pins 2 so the springs 33 will not be lost when the pins 2 are removed and the spring 33 pop out. If the optional washers 32 are used, it may also be desirable to attach the washers 32 to the springs 33 and pins 2 with the same light line, cable or retaining member. A hole may be drilled in each washer 32 to accommodate this light line, cable or other retaining member. In this alternate embodiment, the spring assembly takes the place of wing nuts for applying tension to the panels 5. In this alternate embodiment, the pins 2 are on the outside of the structure, and are attached to an alternate embodiment of the handle 50 shown in FIG. 9A by lines, wires or cables 51. The handle 50 is on the inside of the structure, and the lines, wires or cables 51 are passed through a hole (not shown) in the hurricane shutter panel 5 above and/or below the location of the pins 2. When the pins 2 are extracted by pulling on the handle 50 the springs 33 are released and the panel can then be removed.

Figure 7:
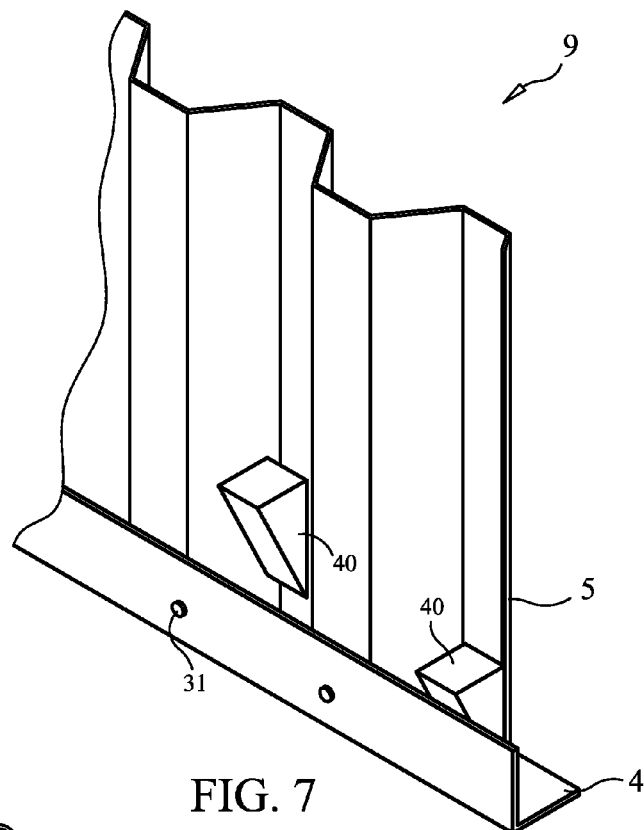
FIG. 7 shows a view from the inside of the first embodiment as installed, using a wedge to provide stabilizing pressure on the panel.

FIG. 7 shows a wedge 40 which is used as an alternate means of maintaining tension of the panel 5. Here, a single wedge 40 is shown wedged between the panel 5 and the angle track 30, however, multiple wedges 40 can be used for this purpose. While this wedging system can be used with any embodiment, it particularly lends itself to use with the alternate embodiments shown in FIGS. 5, 6, 18 and 19. Optionally, the wedge(s) 40 can be attached to the handle (not shown) so the wedge(s) 40 are removed when the user pulls on the handle. Optimally, this attachment should be such that the wedge(s) 40 are removed before the pins 2.

Figure 8:
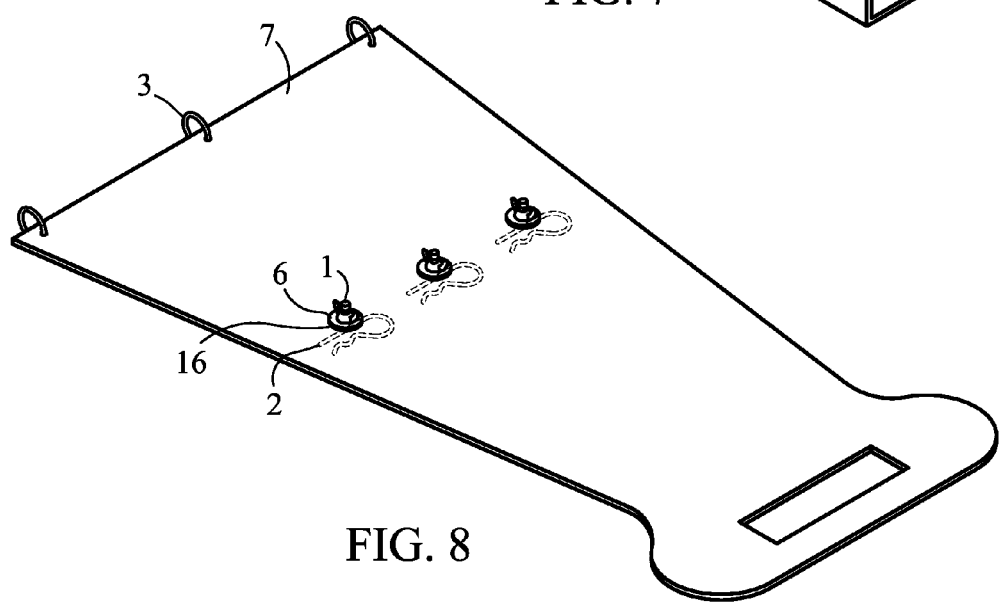
FIG. 8 shows the preferred handle for use with the first and second embodiments. Assembled bolts, washers, nuts and pins for the first embodiment are shown attached for convenience and storage to the handle through three holes drilled through the handle. Rings attached to the end of the handle are ready for attachment to the pins upon installation.

FIG. 8 shows a preferred embodiment of the handle 7 which is designed primarily for use with the first and second embodiments. The rings 3 are attached to the end of the handle 7. The handle 7 is shown in storage configuration with optional holes drilled through the handle for holding the bolts 1, pins 2, washers 16 and wing nuts 6. This optional feature prevents the components from becoming separated from the handle 7 when in storage. Optionally, installation and operating instructions can also be printed on the handle. If more than one panel is being mounted, a handle can be designed to accommodate more than three pins (typically five for two panels), or two handles can be used, one which accommodates three pins and another which accommodates two pins.

Figure 9A:
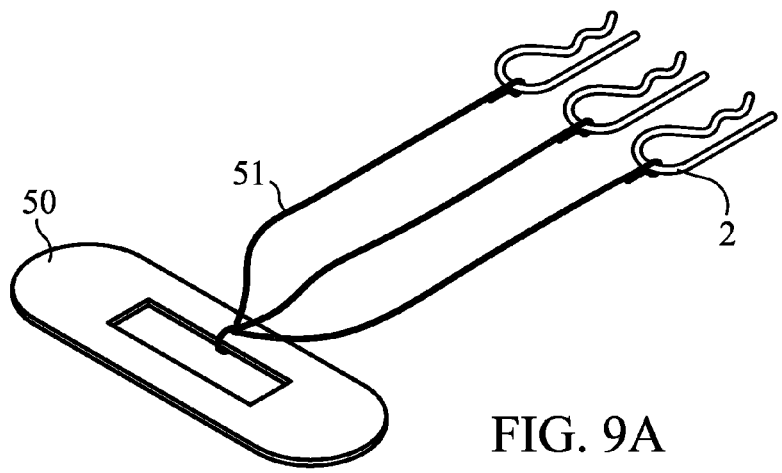
FIG. 9A shows an alternate embodiment of the handle and cable for use with the third and fourth embodiments and with other alternate embodiments.

FIG. 9A shows an alternate embodiment of a handle 50 designed primarily for use with embodiments in which the pins 2 are mounted on the outside of the structure. The handle 50 is located on the inside of the structure and is connected to the pins 2 through a hole (not shown) in the panel (not shown) by lines, wires or cables (51).

Figure 9B:
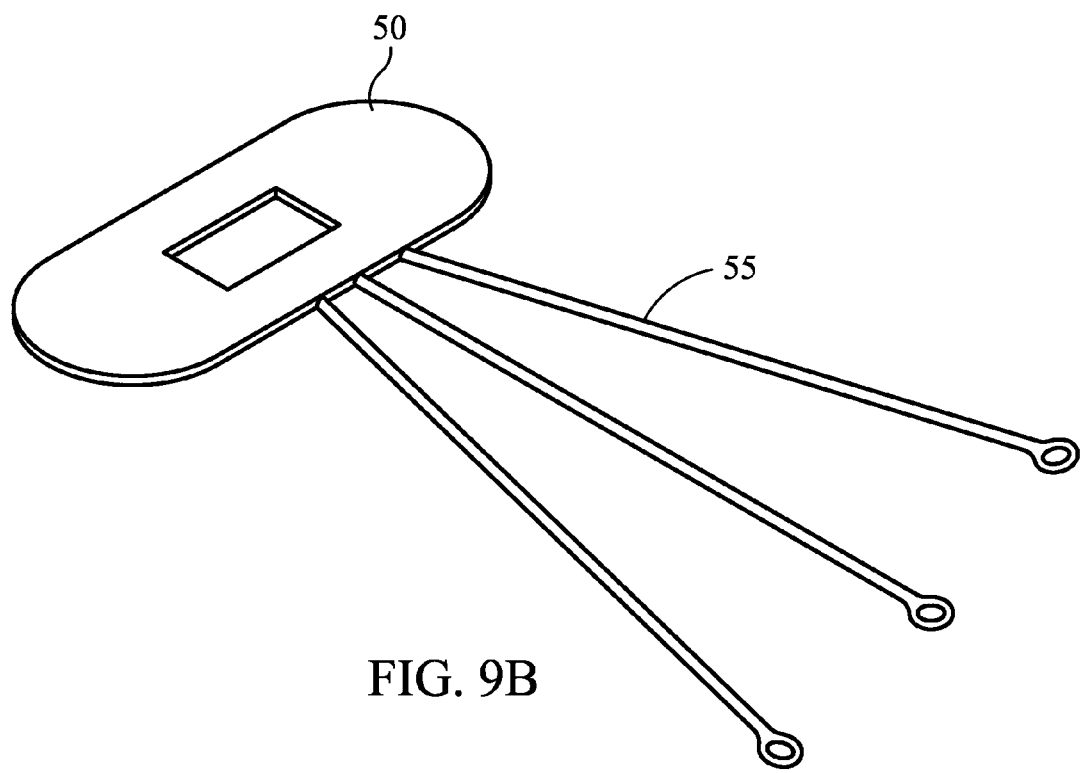
FIG. 9B shows another alternate embodiment of the handle which is designed with pre-dried holes which permit the pins or clips to be attached directly to the handle.

FIG. 9B shows yet another alternate embodiment of the handle 55 which is designed so the pins can attach directly to the handle 55. Preferably, the handle is constructed from a material that is sufficiently strong to apply the necessary tension to the pins without breaking, yet flexible to allow some give in the arms.

While FIGS. 8 and 9 show preferred and alternate embodiments for the handle and connection of the pins to the handle, these are not intended to be limiting, and the assembly of handle, tensile members, and pins may be comprised of various materials and configurations, and may also be integrated into the panel. For example, a set of rings or conduits may be provided on the inside, or in some cases partially on the outside, to guide and retain the tensile members (e.g., cables) to their correct position without binding. In this case, it may be useful to provide a handle which disengages the pins from the bolts by a twisting motion, with the handle pivoting about an axis, to supply the necessary tension. Alternately, a sufficiently rigid connection between the handle and pins may be provided to permit use of a pushing force instead of a pulling force.

Figure 10:
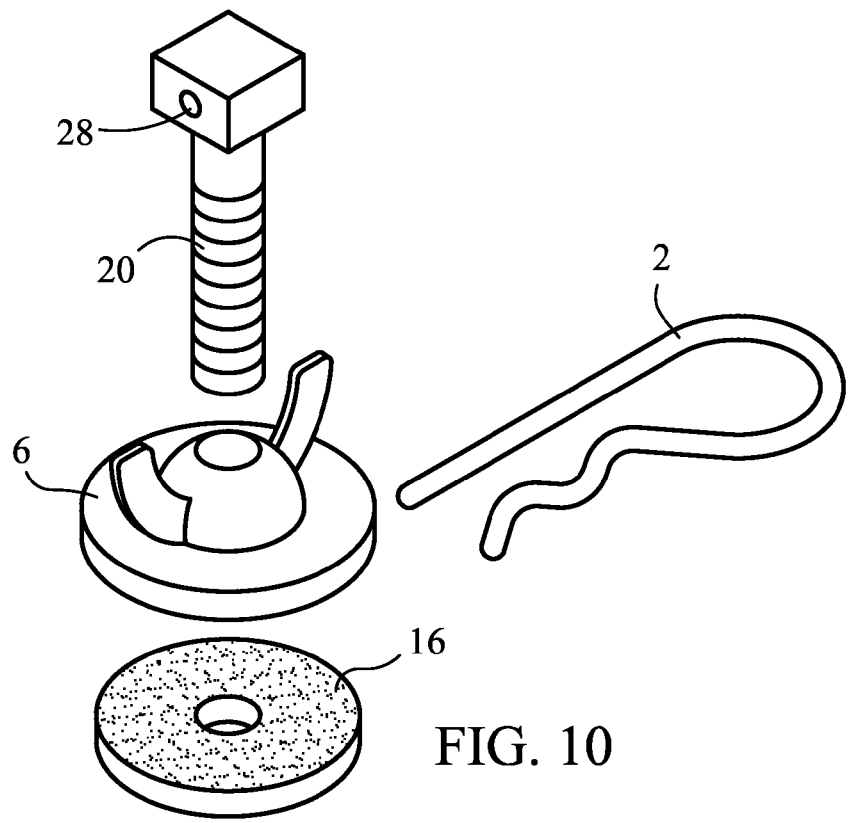
FIG. 10 shows the hardware components used with the second embodiment of the invention, designed for use with F-track: a square headed bolt, washer, wing nut and pin.

FIG. 10 shows the hardware components used with a second embodiment, which utilizes square headed bolts 20, pins 2, optional neoprene washers 16 and wing nuts 6. The bolts 20 have holes 8 provided or drilled within the square head. The holes 28 are sufficiently large in diameter to accommodate the pin 2. The square head of bolt 20 must not be larger than the opening on the front of the F-Track 13, and ideally the head should be sufficient in length and size to prevents the bolt 20 from rotating in the F track 13 thereby keeping the hole 8 aligned in place before the pin 2 is inserted. However, headless bolts with a hole in one end can also be utilized.

In this second embodiments, hitch pin clips are utilized for the pins 2, but any type of pin, for example a cotter pin or quick release pin can be utilized provided that the handle can be attached to the pin 2, the pin 2 can pass through the hole 28 in the bolt 20, and the pin 2 can be removed from the bolt 20 by pulling on a handle (not shown), the object being to hold the bolts 20 in place within the F-Track 13 when the panels 5 are mounted, and to facilitate extraction of the pins 2 and removal of the bolts 20 and panel (not shown) when desired. The pins 2 and bolts 20 are adapted to resist shear force deformation and consistently disengage the pins 2 from the bolts 20 even after application of high winds or impact to the panels. Likewise, the disengaging force is preferably aligned perpendicular to the axis of the bolts 20, such that normal forces produced by storms would not disturb the linkage between the bolts 20 and the connection to the handle (not shown). Other types of latching and disengagement for the bolts 20 may also be provided.

Other components of this second embodiment not shown in FIG. 10 are the F-Track, shutter panel, handle, and rings for attaching the pins to the handle. An optional neoprene washer 16 is used in the second embodiment.

Figure 11:
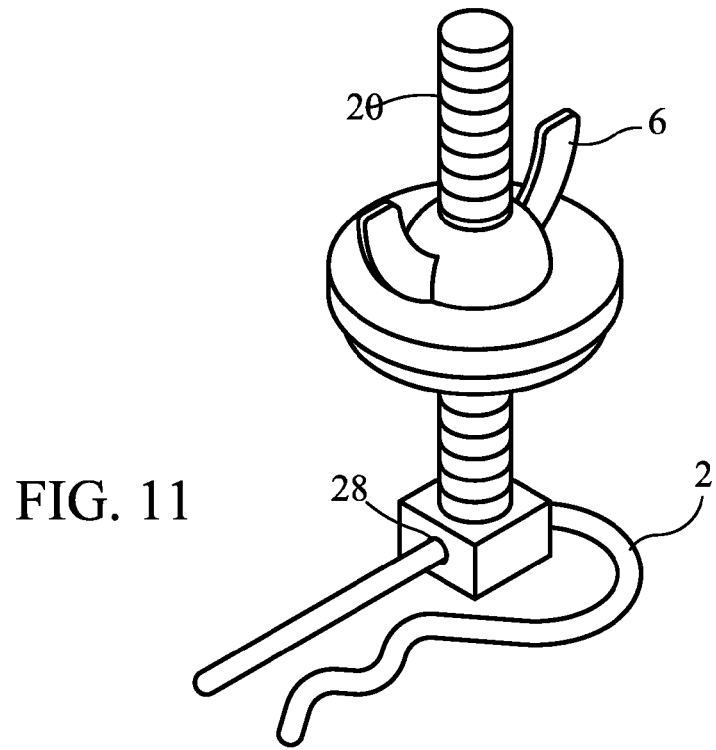
FIG. 11 shows the components of FIG. 10 as assembled.

FIG. 11 shows the hardware components of FIG. 1 as assembled.

Figure 12:
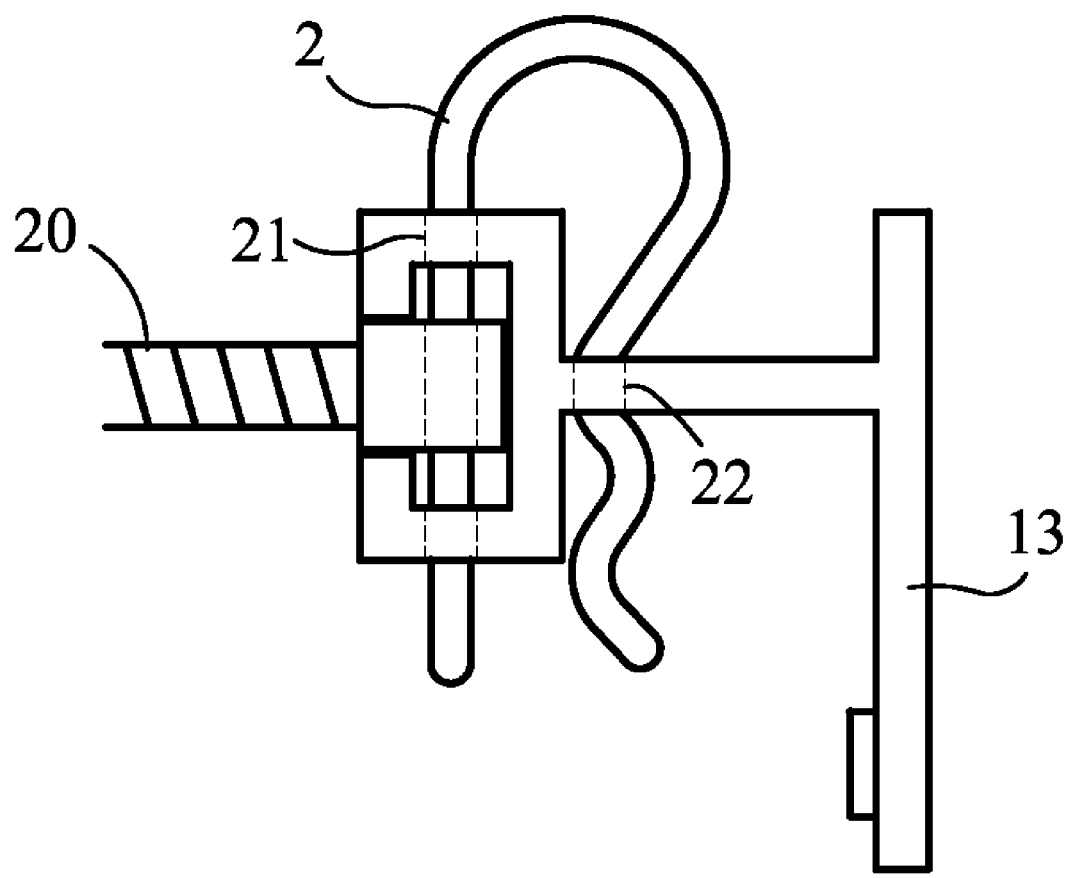
FIG. 12 shows a side view of the second embodiment with the bolt and pin in place in the F-Track, before the panel and handle are attached.

FIG. 12 shows a side view of the components of this second embodiment as mounted in F-Track 13 before the panel (not shown) is installed. A first hole 21 is drilled through the F-Track 13 corresponding to the hole in the bolt 20 to accommodate the pin 2. Because a hitch pin clip is used in this case, a second hole 22 is drilled in the F-Track 13 to accommodate the other end of the pin 2. It should be noted that if another type of pin or clip is used, such as a quick release pin, then only one hole need be drilled in the F-Track. The bolt 20 is attached to the F-Track 13 by placing the pin 2 through the holes in the F-Track 21 and 22, and the hole in the bolt 20.

Figure 13:
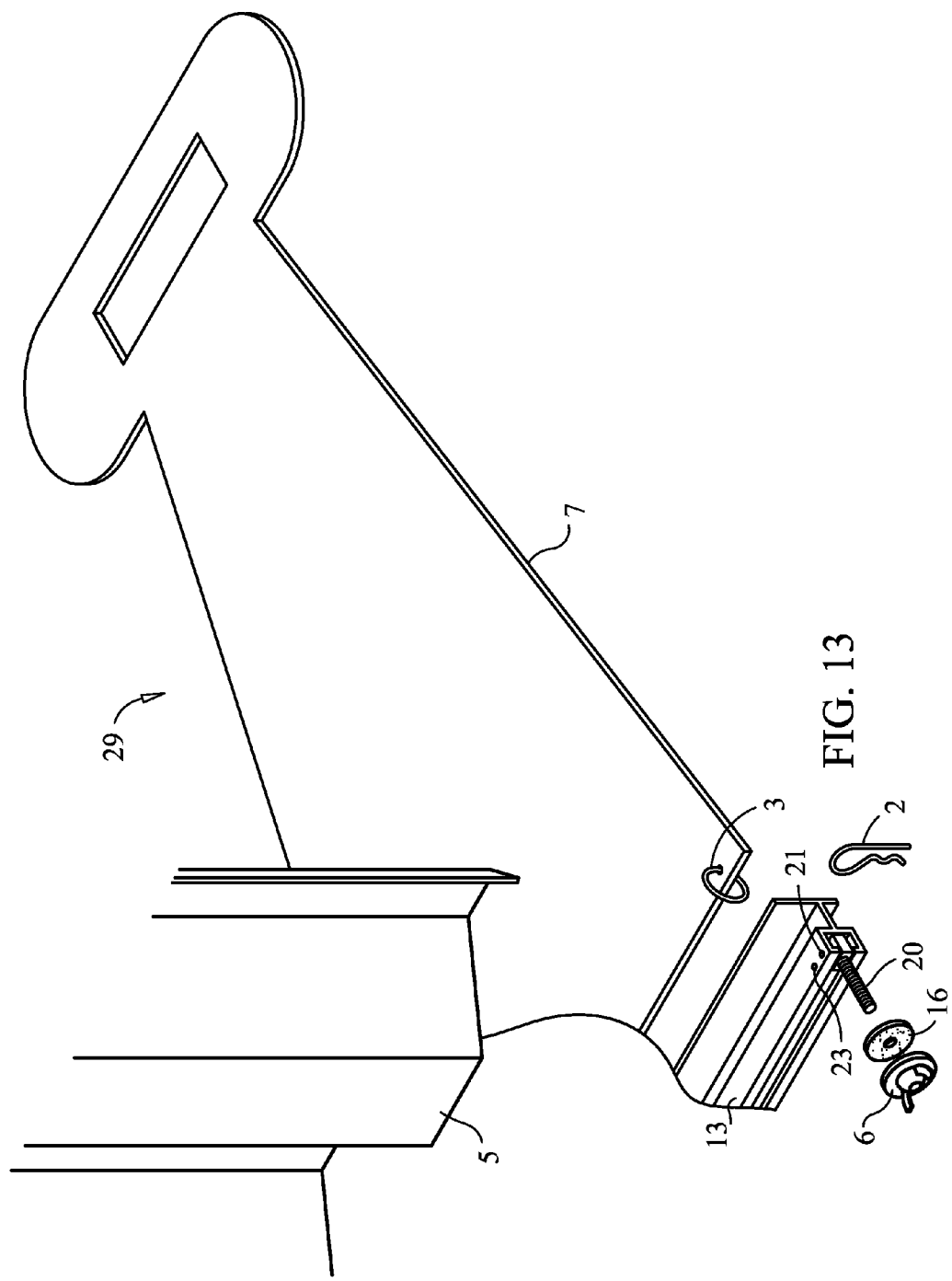
FIG. 13 shows all the components of the second embodiment prior to assembly. Note that the assembly shown in FIG. 12 and this FIG. 13 show an assembly that uses hitch pin clip for the pins, which require two holes be drilled in the F-Track. This FIG. 13, displays an alternate position for the second hole from the one shown in FIG. 12.

FIG. 13 shows the assembly 29 of this second embodiment as ready to be mounted. The combination of the bolts 20, pins 2, rings 3, hurricane panels 5, wing nuts 6, handle 7 and the optional neoprene washer 16 are referred to as the assembly 29. The assembly 29 mounted to the F-Track 13. Typically a hurricane shutter panel 5 has three holes at each end, and a single assembly 29 comprises three bolts 20, three pins 2, three rings 3, three washers 16, one shutter panel 5 and one handle 7, although the number of bolts 20, pins 2, rings 3 and washers 16 can be adjusted to accommodate hurricane shutter panels 5 that are configured with more or less than three holes per panel, and multiple panels 5 may be mounted with multiple assemblies 29.

The optional washer 16, if used, is placed between the panel 5 and the bolt 20. Although in the embodiment, this washer 16 is composed of neoprene, it can be composed of nylon, rubber or any other material suitable for the purpose. The object of this optional washer 16 is to enable the hurricane shutter panel 5 to be secured snugly while requiring less torque on the wing nut 6, thereby minimizing over tightening that would prevent the pins 2 from being easily extracted, while maintaining sufficient tension on the panel 5 to minimize possible oscillation during periods of high winds. If desired, the washer 16 can be attached to the wing nut 6 with an adhesive on one side, or integrally molded to it. While the washer 16 is a desirable component of this second embodiment, its use is not mandatory, and if this washer 16 is omitted the wing nut 6 can be tightened directly against the panel 5.

To mount the panel 5, the handle 7 with the rings 3 is placed on the inside of the structure. The pins 2 are inserted into the F-Track 13 and the bolts 20 to secure the bolts to the F-Track, and the pins 2 are attached to the rings 3 before or after the pins are put in place. The panel 5 is put in place over the bolts 20 and a wing nut is used to secure the panel in place. Note that this FIG. 13 shows an alternate position for the second hole 23.

Figure 14:
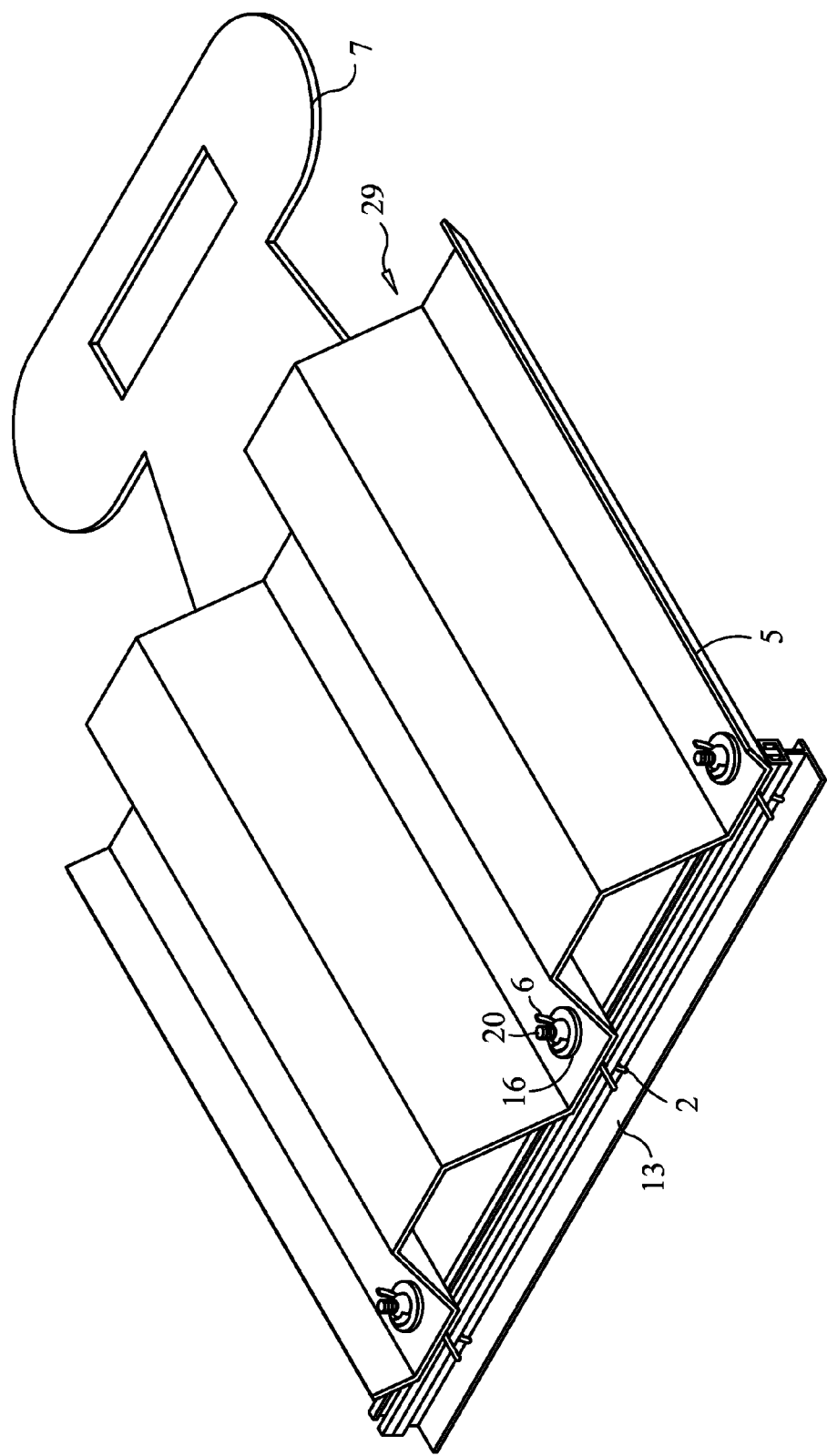
FIG. 14 shows a view from the outside of the second embodiment as assembled.

FIG. 14 shows a view from outside the structure, of the assembly 29 of this second embodiment, as assembled. The F track 13 is modified to accommodate the pins 2 by drilling at least one hole (not visible) in the F track 13 for each bolt 20 and pin 2 combination corresponding to the holes in the panel 5, said at least one hole accommodating the type and size of pins 2 being utilized. The hurricane shutter panel 5 is installed on an F track 13 using the assembly 29 by attaching the bolts 20 to the F-Track 13 with the pins 2, putting the panel 5 in place over the bolts 20 and securing the panel 5 with wing nuts 6. The handle 7 is attached to the pins 2 by a ring (not visible), although the pins can be attached to the handle directly or by any other means suitable for attaching two parts together. To remove the panel 5, the pins 2 are extracted by pulling on the handle 7 thereby allowing the bolts 20 to release from the F-Track 13 when outward pressure is applied to the panel 5 from inside the structure. When the bolts 20 separate from the F-Track, the panel 5 can be removed from the structure. Multiple hurricane shutter panels 5 can be installed on F-Track 13 with multiple assemblies 29.

This second embodiment is shown utilizing hitch pin clips for the pins 2 which requires a first and second hole (21 and 22 in FIGS. 12 and 21 and 23 in FIG. 13) to be drilled into the F-Track for each pin 2 and bolt 20 assembly to be used; however, any type of pins or clips suitable for the purpose, including but not limited to cotter pins and quick release pins can be utilized with the invention, and if so used may require drilling only a single hole in the F-Track 13.

Figure 15:
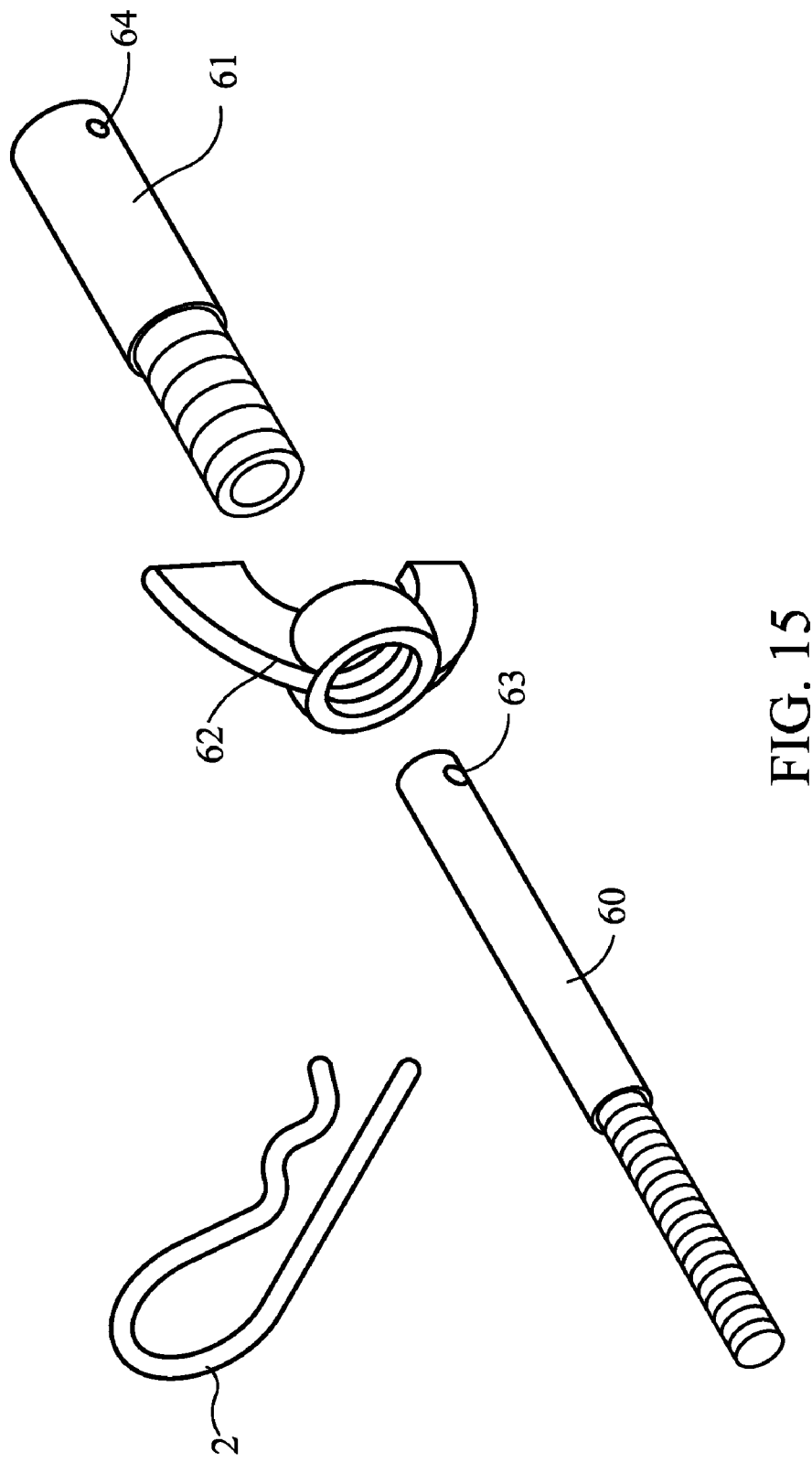
FIG. 15 the hardware components used with the third embodiment of the invention, being a bolt, sleeve, wing nut and a pin.

FIG. 15 shows the hardware components used with a third embodiment that is intended for use with direct mount system that utilize wall anchors for attaching the hurricane shutter panels to the structure. The bolts that would normally be used to attach the hurricane shutter panel being attached with this third embodiment are replaced with bolts 60 that have thread on a first end to that corresponds to the thread on inside the wall anchors. The second end of the bolts 60 may be threaded, or smooth as shown in FIG. 15, and each have holes 63 that are large enough to accommodate a pin 2. The sleeves 61 are of substantially the same length as the second end of the bolts 60, and are smooth on the inside with a diameter sufficient for the sleeves 61 to fit over the second end of the bolts 60. Although the first end of the sleeves 61 is threaded on the outside as shown here, the entire length of the sleeves 61 can be threaded. The second end of the sleeves 61 are preferably smooth as shown here, and have holes 64 corresponding to the holes 63 in the second end of the bolts 60. Wing nuts 62 have thread corresponding to the first end of the sleeves 61.

Figure 16:
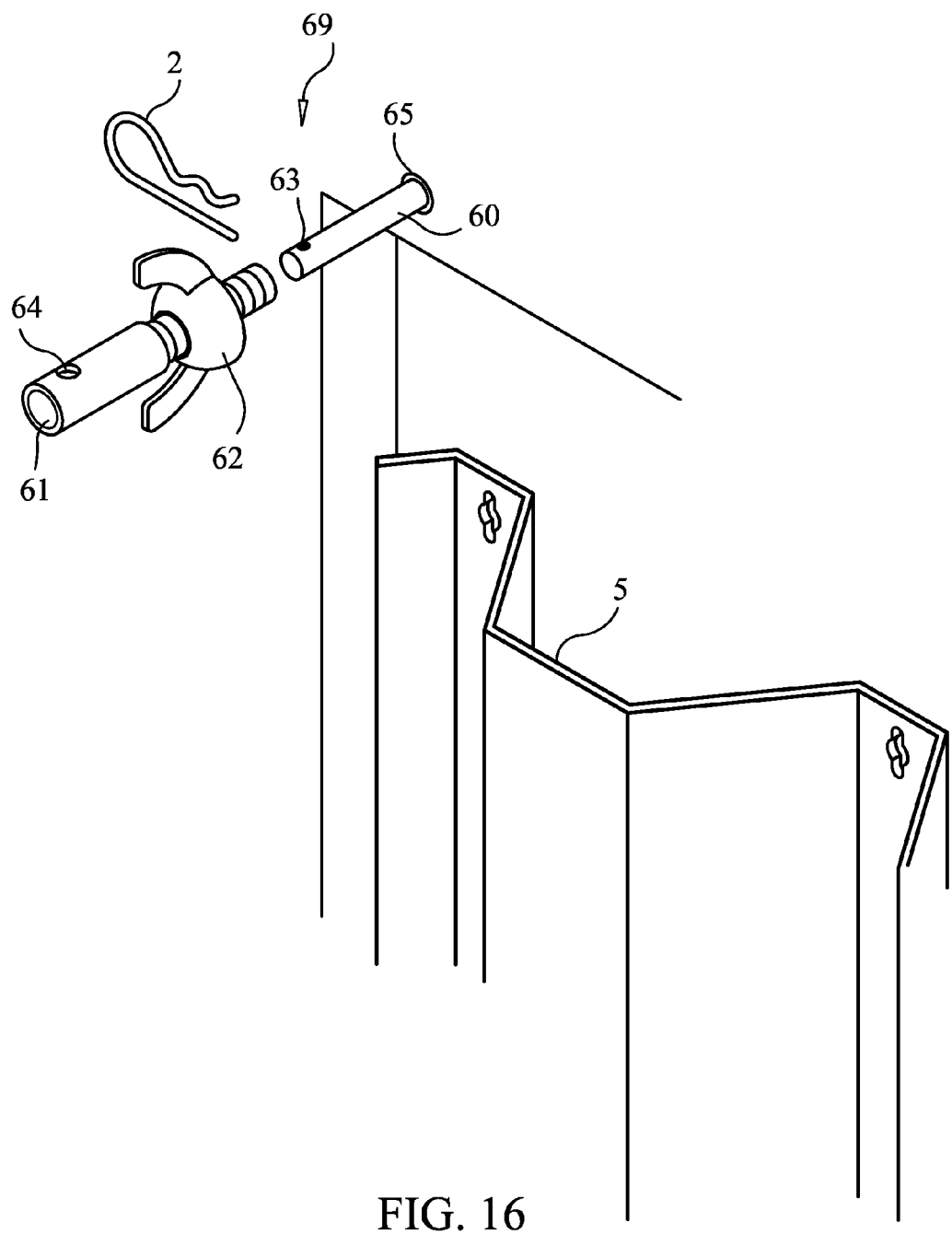
FIG. 16 shows all the components of the third embodiment prior to assembly.

FIG. 16 shows the components of FIG. 15 as ready to be mounted on a structure, and referred to as the assembly 69. To attach the panel 5, with the assembly 69, the first end of the bolts 61 are screwed into the wall anchors 65 where the corresponding panel 5 is to be attached, and the panel 5 is placed over the bolts 60. The wing nuts 62 are threaded onto the sleeves 61, and if the entire sleeves 61 are not threaded as shown here, the wing nuts 62 must be threaded on backwards from the top. After the wing nuts 62 are threaded onto the sleeves 61, the sleeves 61 are put over the second ends of the bolts 60, and secured in place by passing the pins 2 through the holes 63 and 64 in the sleeves 61 and bolts 60. The wing nuts 62 can then be tightened down to secure the panel 5 in place. As with various other embodiments, optional washers (not shown) may be placed between the wing nuts 62 and the panels 5 to aid holding the panel 5 firmly in place without applying too much tension to the pins 2 so as to make them difficult to remove. These optional washers may be attached to the wing nuts 62 by an adhesive on one side.

Figure 17:
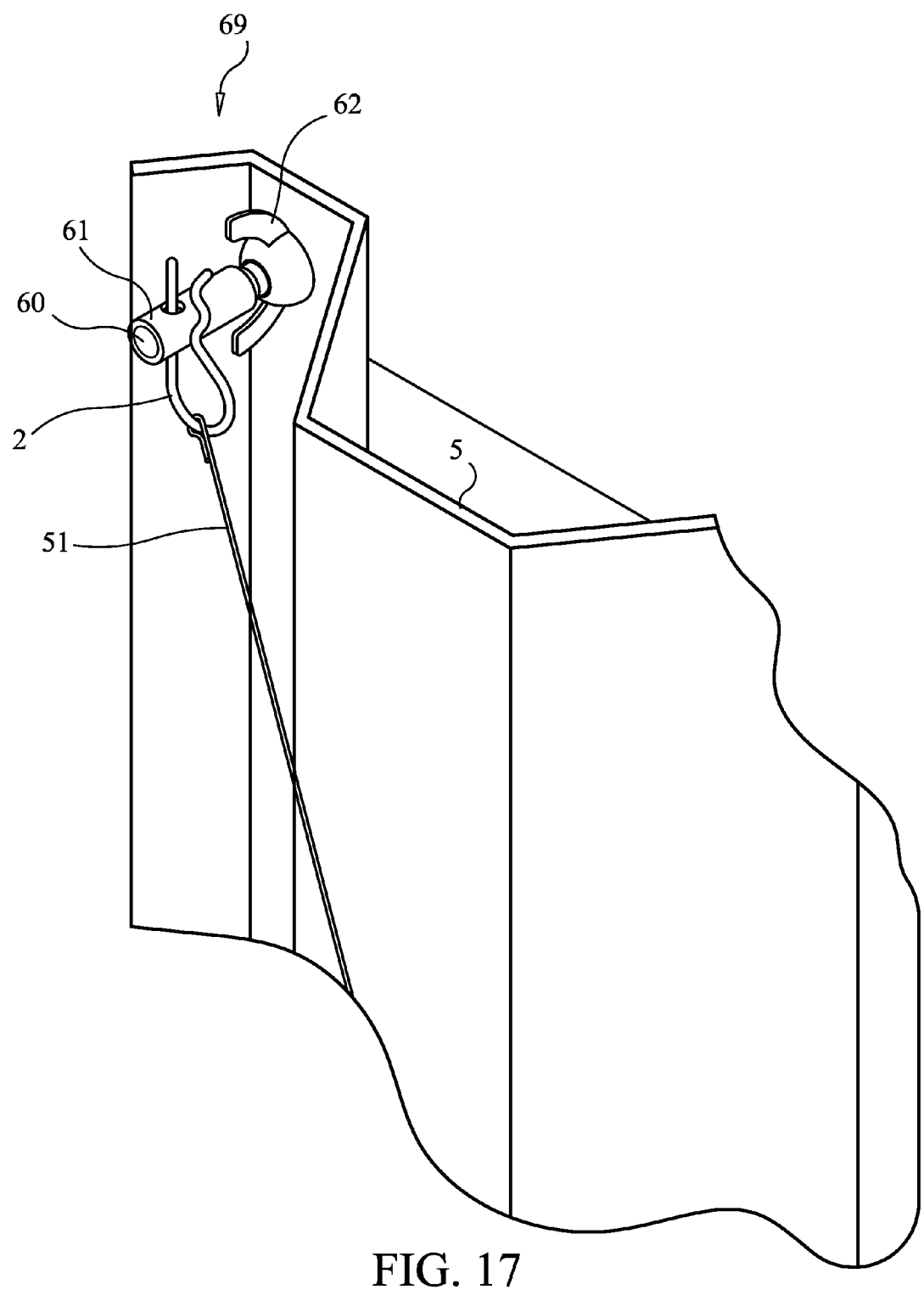
FIG. 17 shows a view from the outside of the third embodiment as assembled.

FIG. 17 shows an outside view of a panel 5 attached to a structure with the assembly 69 of this third embodiment. The pins 2 are located on the outside of the structure, and are attached to an alternate embodiment of the handle (not shown here and shown in FIG. 9A) by lines, wires or cables (also not shown). The handle is on the inside of the structure, and the lines, wires or cables 51 are passed through a hole (not shown) in the panel 5 located above and/or below the location of the pins 2. When the pins 2 are extracted by pulling on the handle, the sleeves 61 are released and the sleeves 61 and panel 5 come off the bolts 60 so the panel can be removed.

Figure 18:
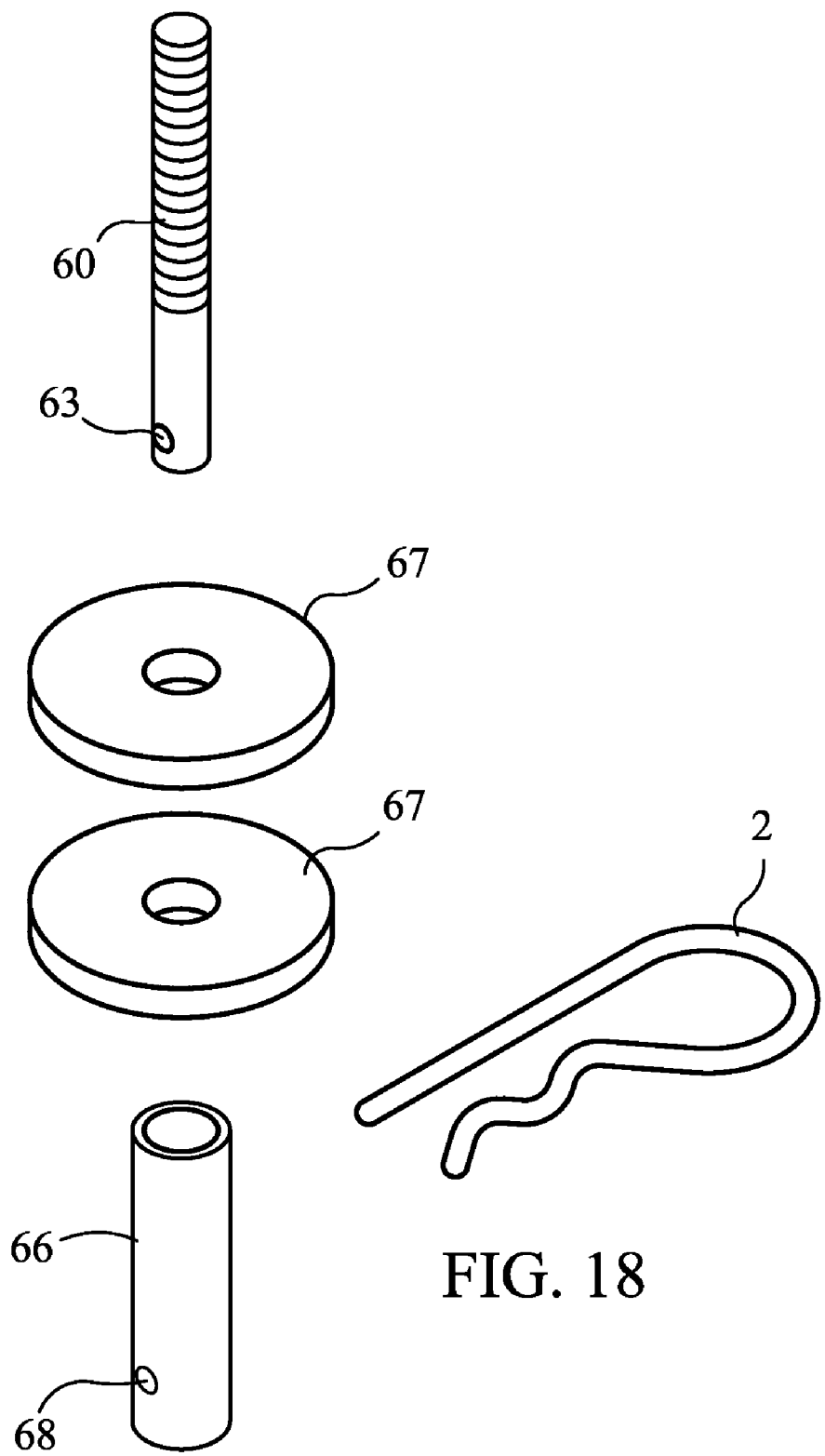
FIG. 18 shows the components of an alternate embodiment of the third embodiment, being a bolt, at least one washer (two shown), a sleeve and a pin.
Figure 19:
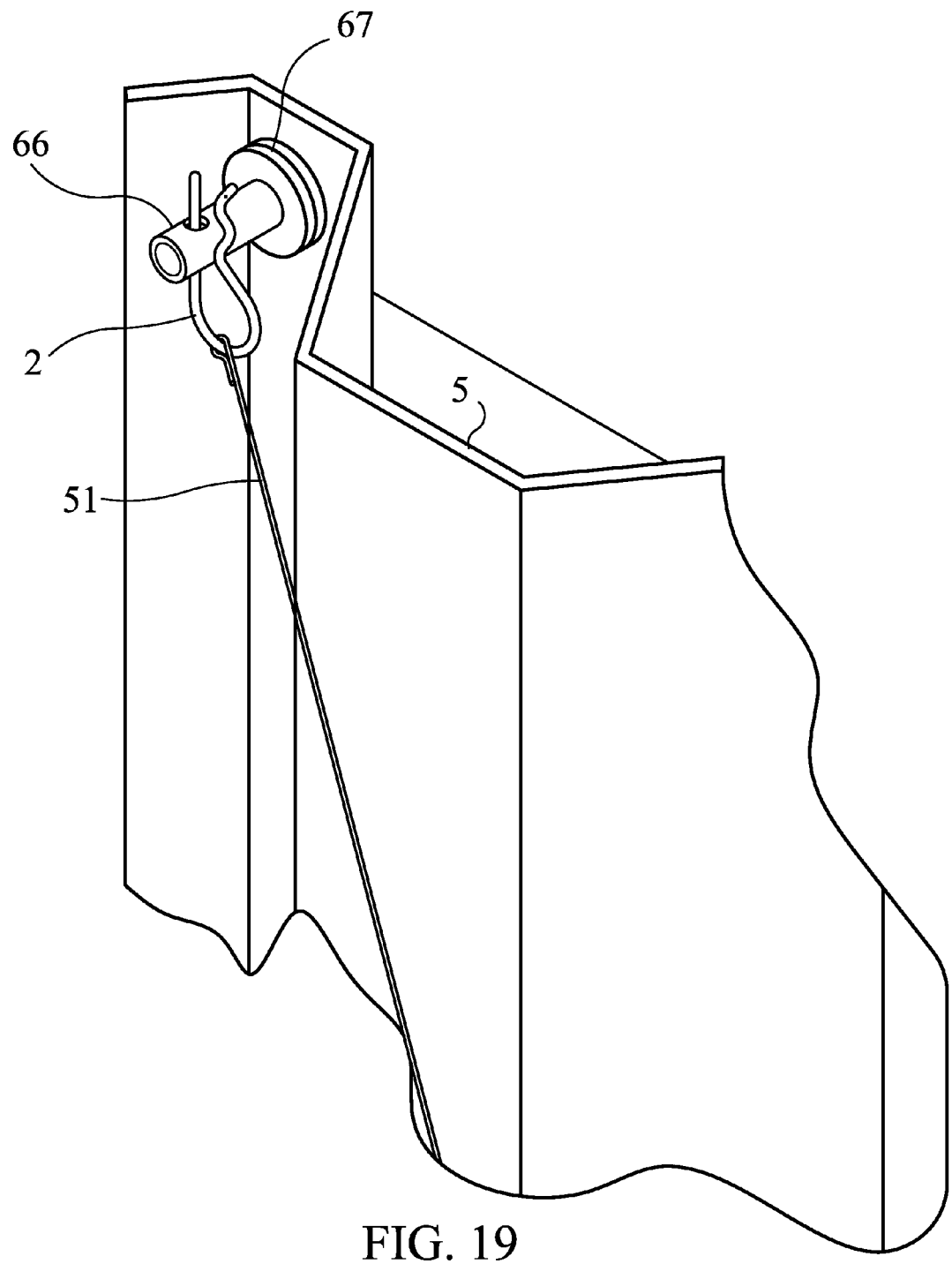
FIG. 19 shows a view from the outside of the third embodiment as assembled

FIGS. 18 and 19 show an alternate implementation of the third embodiment. In this alternate implementation, sleeves 66 are of a slightly shorter length as the second end of the bolts 60, and are smooth on the inside with a diameter sufficient for the sleeves 66 to fit over the second end of the bolts 60. Specifically, the length of the sleeves 66 should be no more than the length of the second end of the bolts 60, less the thickness of the panel 5 and the thickness of at least one washer. 67 (here two washers are shown). The sleeves 66 are preferably smooth on the outside of its entire length as shown here, although the outside can be threaded or partially threaded as well. The sleeves 66 have holes 68 corresponding to the holes 63 in the second end of the bolts 60. In place of wing nuts to secure the panel 5 in place, at least one washer 67 is used with each bolt 61 and sleeve 66 assembly to hold the panel in place. The hole in the at least one washer 67 must be of sufficient diameter for the washer to pass over the bolt 61, but must be a smaller diameter than the sleeve 66, so that the at least one washer 67 can hole the panel 5 in place when the sleeve 66 is attached with the pin 2. Ideally the length of the sleeves 66 combined with the number and thickness of the washers 67 should be sufficient to hold the panel 5 firmly in place. However, because the washers 67 may not secure the panel 5 as firmly as do the wing nuts used in the third embodiment, this alternate implementation particularly lends itself to use of a wedge system as shown and described in FIG. 7. The handle is on the inside of the structure, and the lines, wires or cables 51 are passed through a hole (not shown) in the panel 5 located above and/or below the location of the pins 2. When the pins 2 are extracted by pulling on the handle, the sleeves 66 are released and the sleeves 66 and panel 5 come off the bolts 60 so the panel can be removed.

Typically, when panels are direct mounted, there is no track involved, and as such the direct mount application of this third embodiment and its alternate implementation as discussed above will typically require two assemblies 69 for each panel 5, one to be placed at each end.

While the third embodiment, and its alternate implementation as discussed above are intended for use with direct mounts systems using wall anchors, these embodiments can also be used with direct mount systems in which the bolts are directly and permanently attached to a structure. In order to do this, it is preferable to drill the necessary holes into such bolts prior to installation, and alternately it may be preferable to use direct mount bolts which are adapted with no thread on the mounting end. While holes can be drilled into direct mount bolts that are already installed on a structure, this is not preferred due to the risk of damaging a permanently attached bolt in the drilling process. Accordingly, a fourth embodiment as discussed below adapts the invention to direct mount bolts on an existing installation.

Figure 20:
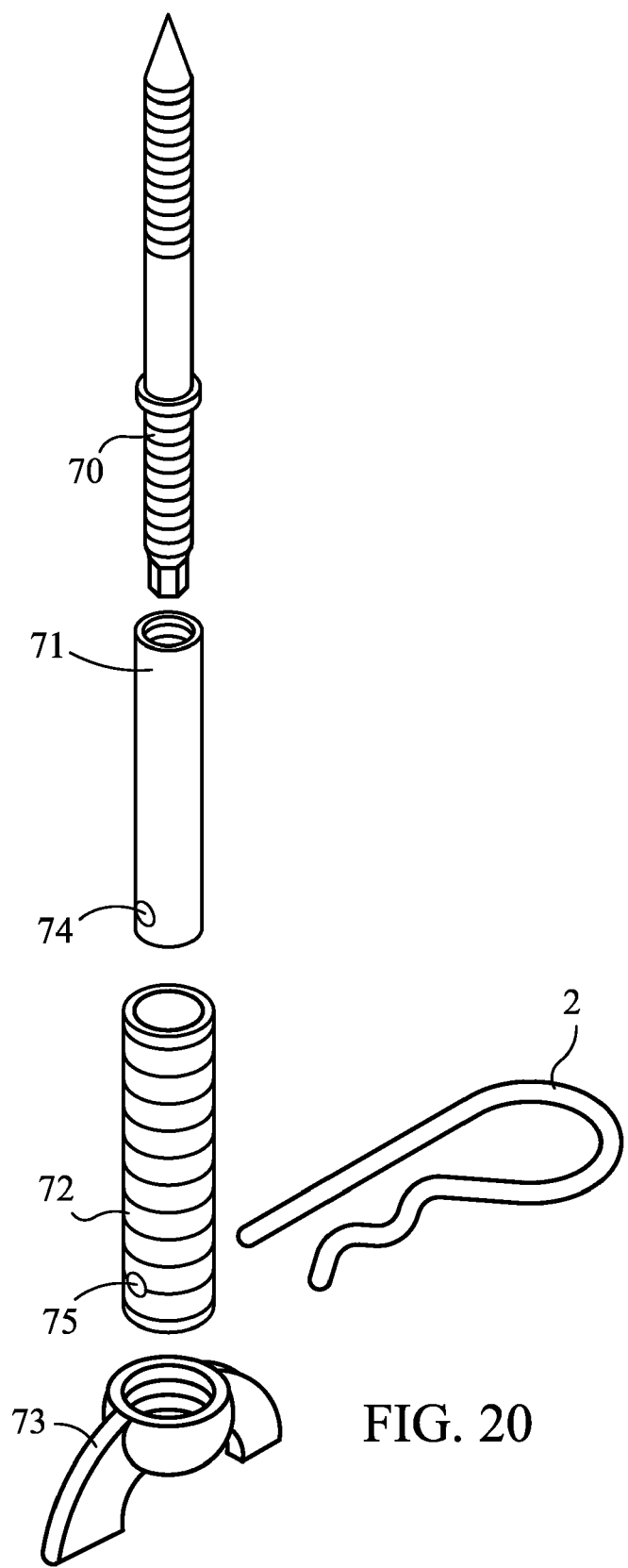
FIG. 20 shows the hardware components used with the fourth embodiment of the invention, being a direct mount bolt, a first sleeve, a second sleeves a wing nut and a pin.

FIG. 20 shows the hardware components used with a fourth embodiment that is intended for use with direct mount system that utilize direct mount bolts which are directly and permanently attached to a structure. This embodiment particularly lends itself to existing installations where the mounting bolts are already installed to a structure, without having to modify such installations. This fourth embodiment uses a two sleeve system, a series of first sleeves 71 and a series of second sleeves 72, pins 2 and wing nuts 73 to attach the panels (not shown) to a permanently installed direct mount bolt 70. The first sleeves 71 are longer than the portion of the direct mount bolt that protrudes from the structure, are threaded on the inside to correspond to the thread on the direct mount bolts 70, have a hole 74 in one end, and preferably the outside surface is smooth (as shown). The second sleeves 72 are of substantially the same length as the first sleeves 71, are smooth on the inside with an inside diameter that is sufficiently large for the second sleeves 72 to fit over the first sleeves 71, have a holes 75 in one end that correspond to the holes 74 in the first sleeves 71, and are threaded on the outside surface (as shown) although this thread could be located on only one end of the second sleeves 72 similar too the first sleeve 61 as shown in FIGS. 15, 16 and 17. In use, the first sleeves 71 are screwed down securely on the direct mount bolts 70 and the panels 5 are put in place. The wing nuts 73 are threaded onto the second sleeves 72 and the second sleeves 72 are attached to the first sleeves 71 by passing the pins 2 through the holes 74 and 75. The wing nuts 73 are then tightened to secure the panel 5 firmly in place. As with various other embodiments, optional washers (not shown) may be placed between the wing nuts 73 and the panels 5 to aid holding the panel 5 firmly in place without applying too much tension to the pins 2 so as to make them difficult to remove. These optional washers may be attached to the wing nuts 73 by an adhesive on one side.

Figure 21:
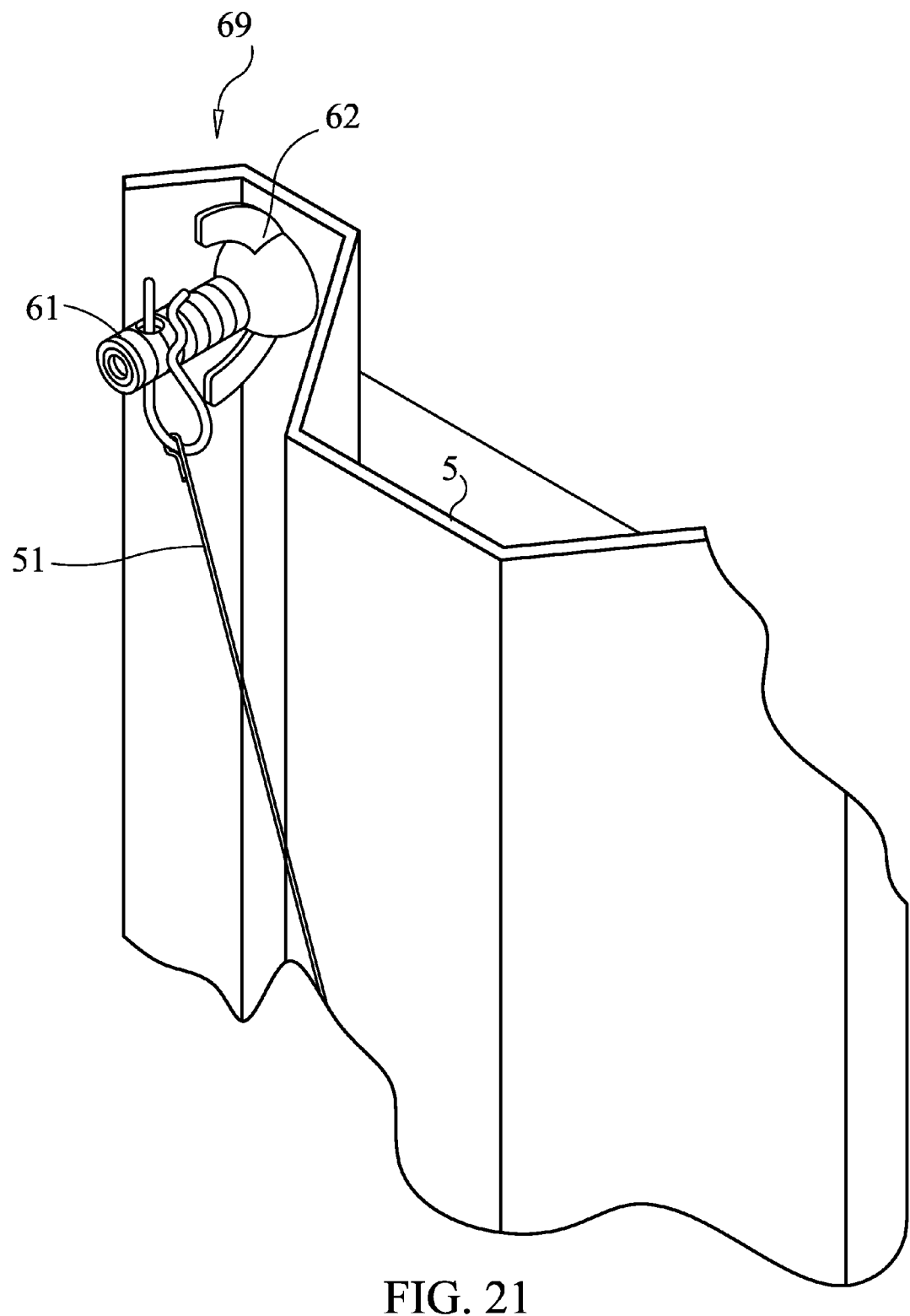
FIG. 21 shows a view from the outside of the fourth embodiment as assembled.

FIG. 21 shows an outside view of a panel 5 attached to a structure with the assembly 79 of this fourth embodiment. The pins 2 are located on the outside of the structure, and are attached to an alternate implementation of the handle (not shown here and shown in FIG. 9A) by lines, wires or cables (also not shown). The handle is on the inside of the structure, and the lines, wires or cables 51 are passed through a hole (not shown) in the panel 5 located above and/or below the location of the pins 2. When the pins 2 are extracted by pulling on the handle, the second sleeves 72 are released and the second sleeves 62 and panel 5 come off the first sleeve 71 so the panel can be removed.

It is important to note that the diameter of the first sleeve 71 must not be larger than the smallest portion of the inside diameter of the mounting holes in the panel 5 or the first sleeve 71 may prevent the panel 5 from being removed. Accordingly, it may be necessary to enlarge the mounting holes of the panel(s) 5 if such panel(s) are to be used with this fourth embodiment.

It should be noted that the embodiments described herein are not limited to use with hurricane shutter panels. For example, in high crime areas, bars or wire screen may be installed over openings, and the systems of the first and second embodiments may be modified to enable quick release of a bar or wire screen assembly from the inside to enable the opening to be used as an emergency egress. Likewise, the sleeve system of the third and fourth embodiments can be used to securely attach any object to any surface while enabling quick release of that object, for example the attachment of a life boat to the deck of a ship, where quick release of the life boat may be desirable.

The instant invention has been shown and described herein in what is considered to be the most practical and preferred embodiments. It is recognized, however, that departures may be made therefrom within the scope of the invention and that obvious modifications will occur to a person skilled in the art.

What we claim is:

1. An internal release mechanism for a panel attached to an outside of a wall of a structure, comprising:

an elongated member, adapted to pass through a close-fitting aperture formed in at least one of the wall and the panel, and selectively transmit a tensile force between the panel and the wall;

a quick release structure, adapted to engage the elongated member, to selectively obstruct the close-fitting aperture when in an engaged state, preventing disengagement by transmitting a tensile force between the wall and the panel, and to clear the close-fitting aperture to thereby disengage the panel from the wall when in a disengaged state wherein the elongated member responds to a tensile force by passing unobstructed through the close-fitting aperture, the disengaged state being entered upon application of a sufficient force to the quick release structure, substantially without binding due to the tensile force on the elongated member between the wall and the panel; and an actuator, for selectively applying the sufficient force for disengaging the quick release structure from the elongated member, and in dependence on a controlv accessible from an inside of the panel, wherein the quick release mechanism comprises:

at least one cylindrical shell, having a wall and an axis, the at least one cylindrical shell being at least partially threaded on at least one of an inner surface and an outer surface of the wall, adapted to be fastened over an elongated member;

at least one aperture, extending through the wall of the at least one cylindrical shell;

at least one element, adapted to be inserted in the at least one aperture, having a first position in which the element extends through the at least one aperture, adapted to retain an object having a perforation through which the at least one cylindrical shell passes, and a second position, in which the element is clear of the outer surface of at least one aperture, adapted to release the object and allow the perforation to pass over the elongated member; and a release, provided to transmit a force to the at least one element, to cause it to move from the first position to the second position, the release being adapted to move the at least one element from the first position to the second position in response to a pulling force, to allow removal of the object.

2. The internal release mechanism according to claim 1, wherein the elongated member comprises at least one of a bolt and a stud, adapted to pass through the closely-fitted aperture in a frame when in a disengaged state from the quick release structure and to be retained by the frame when in an engaged state.

3. The internal release mechanism according to claim 1, wherein the quick release structure comprises a retaining pin, and the elongated member has an aperture adapted to receive the pin, the engaged state having the retaining pin inserted through the aperture and the disengaged state having the retaining pin free from the aperture.

4. The internal release mechanism according to claim 1, wherein the actuator is connected to the quick-release structure and comprises at least one of a ring, wire, line or cable adapted to provide a tensile force.

5. The internal release mechanism according to claim 4, wherein the actuator control comprises a handle, adapted to be pulled by a human hand to provide the tensile force on the ring wire, line or cable, to reconfigure the quick-release structure from the engaged state to the disengaged state.

6. The internal release mechanism according to claim 1, wherein the shutter panel is a hurricane panel.

7. The internal release mechanism according to claim 1 wherein the quick release mechanism comprises of at least one of a single sleeve over the elongated member, and a combination of first sleeve and second sleeve over the elongated member.

8. The internal release mechanism according to claim 1, wherein the quick release structure automatically engages the elongated member during installation of the shutter panel, and thereafter retains the shutter panel to the wall until the actuator is actuated.

9. The internal release mechanism according to claim 1, wherein the control comprises a first actuator control provided interior to the shutter panel and a second actuator control provided exterior to the shutter panel.

10. The internal release mechanism according to claim 1, further comprising:

a frame, mounted to the wall, having a central egress aperture formed therein and the closely-fitting aperture formed at a periphery thereof, the actuator being adapted to be controlled from at least the inside of the wall by a manual control disposed within the central egress aperture.

11. The internal release mechanism according to claim 1, wherein the actuator comprises a flexible elongated tensile structure, adapted to supply a tensile force on the quick release structure from a manually operated handle adapted to receive a manual force, to change a position of the quick release structure from the engaged state to the disengaged state, the elongated member is attached in fixed position to the wall, and the closely-fitting aperture is formed through the panel.

* * * * *